United States Patent
Thota et al.

(10) Patent No.: US 11,070,706 B2
(45) Date of Patent: Jul. 20, 2021

(54) NOTIFICATIONS FOR DEVIATIONS IN DEPICTION OF DIFFERENT OBJECTS IN FILMED SHOTS OF VIDEO CONTENT

(71) Applicant: SONY CORPORATION, Tokyo (JP)

(72) Inventors: Praveen Thota, Bangalore (IN); Santhosh Balagopal, Bangalore (IN); Sweta Agarwal, Bangalore (IN); Masood Lodi, Bangalore (IN); Neelima Manalar, Bangalore (IN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/192,071

(22) Filed: Nov. 15, 2018

(65) Prior Publication Data

US 2020/0162641 A1     May 21, 2020

(51) Int. Cl.
| | |
|---|---|
| *G11B 27/00* | (2006.01) |
| *H04N 5/93* | (2006.01) |
| *H04N 5/14* | (2006.01) |
| *G11B 27/022* | (2006.01) |
| *G06K 9/00* | (2006.01) |
| *G06K 9/03* | (2006.01) |
| *G06F 3/0484* | (2013.01) |
| *H04N 9/80* | (2006.01) |

(52) U.S. Cl.
CPC ......... *H04N 5/147* (2013.01); *G06F 3/04847* (2013.01); *G06K 9/00711* (2013.01); *G06K 9/036* (2013.01); *G11B 27/022* (2013.01)

(58) Field of Classification Search
USPC ................... 386/278, 280, 282, 239, 248
See application file for complete search history.

(56) References Cited

U.S. PATENT DOCUMENTS

| | | |
|---|---|---|
| 6,321,024 B1 | 11/2001 | Fujita et al. |
| 6,721,454 B1 | 4/2004 | Qian et al. |
| (Continued) | | |

FOREIGN PATENT DOCUMENTS

| | | |
|---|---|---|
| JP | 2011-239406 A | 11/2011 |
| JP | 2015-100031 A | 5/2015 |
| (Continued) | | |

OTHER PUBLICATIONS

Pickup, et al., "Automatic Retrieval of Visual Continuity Errors in Movies", CIVR '09, Jul. 8-10, 2009, 8 pages.

(Continued)

*Primary Examiner* — Daquan Zhao
(74) *Attorney, Agent, or Firm* — Chip Law Group

(57) ABSTRACT

A video editing device includes a memory that stores first video content and includes circuitry that extracts a first image frame of a first filmed shot of the first video content and a second image frame of a second filmed shot of the first video content. The first image frame is a last frame of the first filmed shot and the second image frame is a first frame of the second filmed shot. The circuitry detects a first set of objects from the extracted first image frame and a second set of objects from the extracted second image frame. The circuitry further generates and outputs notification information associated with a first object based on a deviation of at least a first visual attribute of the first object in the first image frame from at least a second visual attribute of the first object in the second image frame.

20 Claims, 10 Drawing Sheets

(56) References Cited

U.S. PATENT DOCUMENTS

| | | | |
|---|---|---|---|
| 6,985,623 B2 | 1/2006 | Prakash et al. | |
| 8,111,254 B2* | 2/2012 | Jang | G06T 15/205 |
| | | | 345/419 |
| 8,345,769 B1* | 1/2013 | Diard | G06K 9/00765 |
| | | | 375/240.24 |
| 9,122,948 B1* | 9/2015 | Zhu | G05D 1/0214 |
| 9,600,733 B1* | 3/2017 | Wilbert | G06K 9/325 |
| 9,761,013 B2* | 9/2017 | Nojima | G06T 7/246 |
| 2013/0163966 A1* | 6/2013 | Kubsch | H04N 9/87 |
| | | | 386/353 |
| 2016/0073017 A1* | 3/2016 | Ogasawara | A63F 13/26 |
| | | | 463/31 |

FOREIGN PATENT DOCUMENTS

| | | | |
|---|---|---|---|
| KR | 10-2009-0093904 A | 9/2009 | |
| KR | 10-2016-0078215 A | 7/2016 | |
| KR | 10-2016-0092367 A | 8/2016 | |
| WO | 2008/136466 A1 | 11/2008 | |

OTHER PUBLICATIONS

Office Action for JP Patent Application No. 2019-201232, dated Sep. 23, 2020, 02 pages of Office Action and 02 pages of English Translation.

Office Action for KR Patent Application No. 10-2019-0138442, dated Jun. 25, 2020, 07 pages of Office Action and 06 pages of English Translation.

\* cited by examiner

NOTIFICATIONS FOR DEVIATIONS IN DEPICTION OF DIFFERENT OBJECTS IN FILMED SHOTS OF VIDEO CONTENT

CROSS-REFERENCE TO RELATED APPLICATIONS/INCORPORATION BY REFERENCE

None.

FIELD

Various embodiments of the disclosure relate to video editing technologies. More specifically, various embodiments of the disclosure relate to a video editing device, a method, and a software to notify deviations in depiction of different objects in filmed shots of video content.

BACKGROUND

Recent advancements in the field of video editing have led to development of various techniques that facilitate Non-Linear Editing (NLE) of video content. Traditionally, the video content may be captured by one or more image capture devices, in numerous production states at different times and/or production locations. The video content (for example, post-production movie content) includes a plurality of scenes and each of the plurality of scenes includes numerous consecutive shots. Typically, the consecutive shots of the scene may be captured either continuously or after a certain duration (for example after certain hours or days). Various conventional techniques are available through which an editor may perform various editing functions on the captured shots to generate the scene or the video content. The editor may need to manually analyze continuity errors associated with depiction of various objects (for example, humans or non-living entities) present in multiple shots of one or more scenes. The identification of continuity errors may be required to avoid a discontinuity or prevent an anomaly in depiction of various objects in between the multiple shots of the one or more scenes. Manual analysis leads to inaccuracy in identification of the continuity errors in depiction of the objects. This may further reduce overall quality of the video content and the editor's credibility among the audiences of the video content.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A video editing device and a method to control notifications for deviations in depiction of different objects in filmed shots of video content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
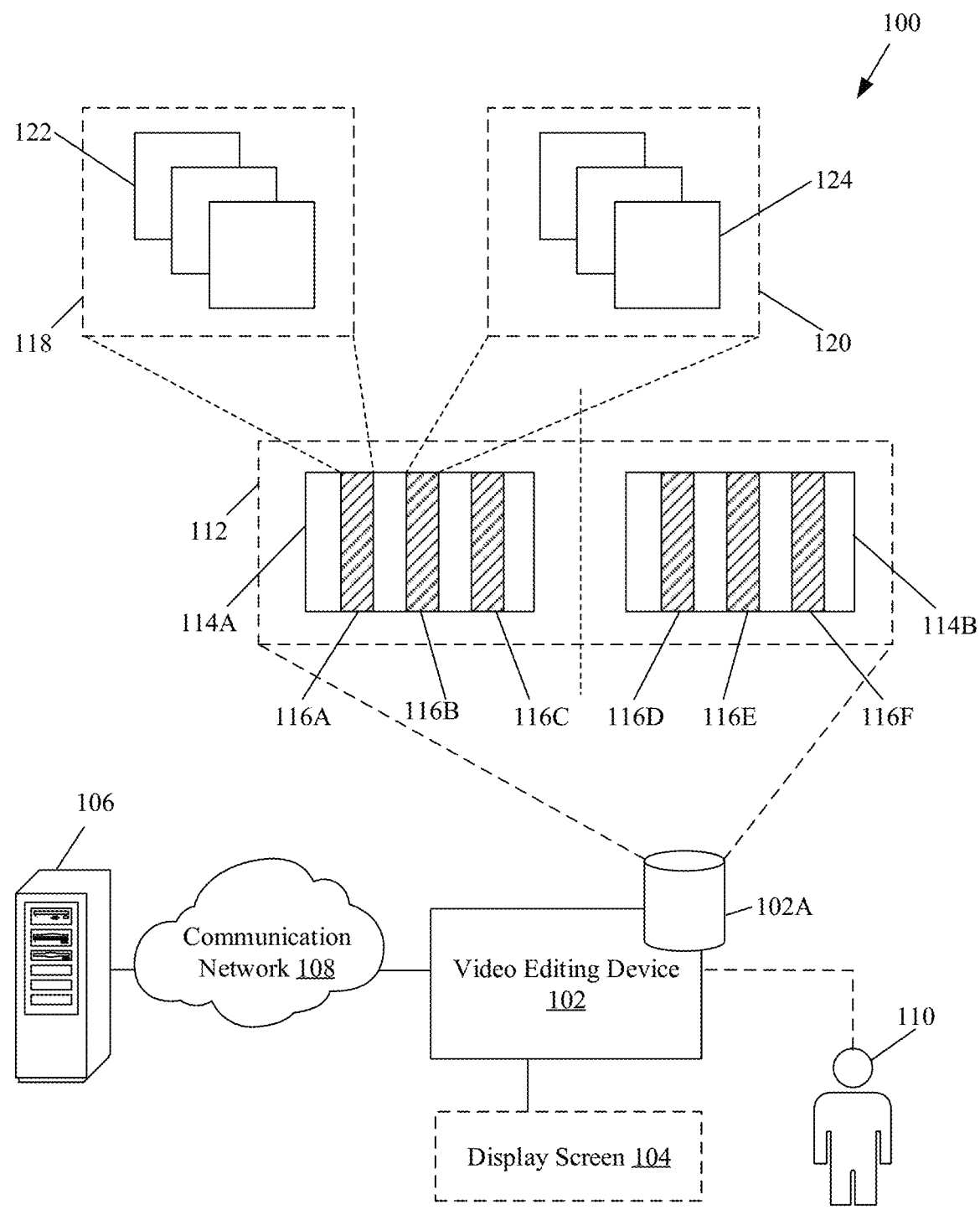
FIG. 1 illustrates an exemplary environment for control of notifications for deviations in depiction of different objects in filmed shots of video content, in accordance with an embodiment of the disclosure.

The following described implementations may be found in the disclosed device and method to control notifications for deviations in depiction of different objects in filmed shots of video content. Exemplary aspects of the disclosure provide a video editing device which automatically checks continuity of different objects between multiple filmed shots of a scene in the video content. The automated continuity check by the video editing device ensures consistency between the multiple filmed shots. The video editing device further provides one or more notifications to an editor of the video content about deviations in depiction of the different objects present between the multiple filmed shots based on the automatic continuity check. Such notifications may further assist the editor to improve overall quality of the video content during production and post-production phases of the video content.

The video editing device may include a memory configured to store the video content (for example a movie) that may include a set of filmed scenes of a filmed sequence. The set of filmed scenes may include a plurality of filmed shots. The plurality of filmed shots of a filmed scene may be consecutive shots captured continuously or after certain duration (for example after certain hours or days) by a video capturing device. The plurality of filmed shots in the filmed scene may include a plurality of objects which may be common in the plurality of filmed shots. The plurality of objects may be various living objects (for example humans)

and non-living objects. The disclosed video editing device may compare the plurality of objects between the filmed shots to determine whether the plurality of objects are depicted with similar visual attributes in the filmed shots. The disclosed video editing device may generate a three-dimensional (3D) images of the plurality of objects for accurate comparison of the visual attributes. Examples of the visual attributes associated with the plurality of objects may include, but are not limited to, shape, a size, a dimension, a color, a brightness value, a contrast value, a texture, an orientation, an angle of tilt, a posture, or textual information. The video editing device may further determine deviation of the plurality of objects between the filmed shots based on the comparison. The video editing device may automatically check the continuity of the plurality of objects between the filmed shots based on the determined deviation. The video editing device may further provide notifications about various errors in the continuity between the filmed shots to the editor of the video content. The video editing device may also determine factual errors in the filmed shots based on a timeline of the captured video content and respective stored timelines of the plurality of objects, and further provide the notification to the editor based on the determined factual errors. The video editing device may also provide notification to the editor based on the comparison of the plurality of objects in the video content with similar objects present in another video content stored in a database. Based on such automated notifications from the video editing device, the editor may take appropriate decisions either to reshoot the filmed shots or apply different image processing techniques to maintain continuity of the plurality of objects and reduce the detected factual errors. This improves overall quality of the video content finally produced after the editing phase and further enhance overall credibility of the editor to produce high-quality video content in lesser time.

FIG. 1 illustrates an exemplary environment for control of notifications for deviations in depiction of different objects in filmed shots of video content, in accordance with an embodiment of the disclosure. With reference to FIG. 1, there is shown an network environment 100. The network environment 100 may include a video editing device 102, a data storage system 102A, a display screen 104, a server 106, and a communication network 108. The video editing device 102 may be communicatively coupled to the server 106, via the communication network 108. There is further shown a user 110 associated with the video editing device 102.

With reference to FIG. 1, there is further shown a first video content 112 which may include a set of filmed scenes 114A to 114B. The set of filmed scenes 114A to 114B may include a first filmed scene 114A and a second filmed scene 114B. The first filmed scene 114A may include a plurality of filmed shots 116A to 116C. Similarly, the second filmed scene 114B may include another plurality of filmed shots 116D to 116F. A first filmed shot 116A may include a sequence of image frames 118 and a second filmed shot 116B may include a sequence of image frames 120. There is further shown a first image frame 122 of the first filmed shot 116A and a second image frame 124 of the second filmed shot 116B. In accordance with an embodiment, the first image frame 122 may be a last frame of the sequence of image frames 118 of the first filmed shot 116A and the second image frame 124 may a first frame of the sequence of image frames 120 of the second filmed shot 116B.

The video editing device 102 may comprise suitable logic, circuitry and interfaces that may be configured to receive an editing request from the user 110 (for example an editor) and retrieve the first video content 112 from the data storage system 102A based on the received editing request. In accordance with an embodiment, the video editing device 102 may be configured to detect a first set of objects (not shown) in the first image frame 122 and detect a second set of objects (not shown) in the second image frame 124. The video editing device 102 may be further configured to check whether a first object in the detected first set of objects is absent in the detected second set of objects in the second image frame 124. In some embodiments, the video editing device 102 may be configured to determine a deviation of a first visual attribute of the first object in the first image frame 122 from a second visual attribute of the first object in the second image frame 124. In accordance with an embodiment, the video editing device 102 may be further configured to determine continuity or discontinuity of the first object between the first image frame 122 and the second image frame 124 based on the determined deviation. In some embodiments, the video editing device 102 may be configured to determine the continuity or the discontinuity of the first object based on the determination that the first object of the first image frame 122 is absent in the second image frame 124. In accordance with an embodiment, the video editing device 102 may be configured to detect factual errors with at least one of the detected first set of objects and/or at least one of the detected second set of objects in at least one image frame in the set of filmed scenes 114A to 114B. The video editing device 102 may be further configured to output notification information for the user 110 based on the determined discontinuity or the factual errors. Examples of the video editing device 102 may include, but are not limited to, a non-linear editing system (NLE), a non-linear video editing system (NLVE), a video editing system, a video editing controller, a media production system, a computer workstation, a mainframe computer, a handheld computer, a cellular/mobile phone, a smart appliance, a video player, and/or other computing device with image processing capability.

The data storage system 102A may comprise suitable logic, circuitry, and interfaces that may be configured to store the first video content 112 which may include the set of filmed scenes 114A to 114B. In accordance with an embodiment, the data storage system 102A may be configured to store first timeline information which indicates an era related to the first video content 112. In accordance with an embodiment, the data storage system 102A may be configured to store metadata associated with the plurality of filmed shots 116A to 116F. The data storage system 102A may be configured to store the notification information associated with the first object for which the video editing device 102 determines the discontinuity or the factual error. In accordance with an embodiment, the data storage system 102A may be a memory (not shown) or database (not shown) integrated in the video editing device 102.

The display screen 104 may comprise suitable logic, circuitry, and interfaces that may be configured to display the notification information for the user 110. The display screen 104 may be communicatively coupled with the video editing device 102, via a communication channel (not shown). The display screen 104 may be realized through several known technologies such as, but not limited to, at least one of a Liquid Crystal Display (LCD) display, a Light Emitting Diode (LED) display, a plasma display, and an Organic LED (OLED) display technology, and other display. In accordance with an embodiment, the display screen 104 may refer to a display screen of smart-glass device, a see-through display, a projection-based display, an electrochromic display, and a transparent display. A person with ordinary skill in the art will understand that the scope of the disclosure is not limited to an implementation of the video editing device 102 and the display screen 104 as separate entities. In accordance with an embodiment, the functionalities of the display screen 104 may be implemented by the video editing device 102, without departure from the scope of the disclosure.

The server 106 may comprise suitable logic, circuitry, and interfaces that may be configured to store the first video content 112 which may include the set of filmed scenes 114A to 114B. The server 106 may be configured to store the first timeline information which indicates the era related to the first video content 112. In accordance with an embodiment, the server 106 may be configured to store second timeline information of different objects of different object types. The second timeline information may indicate timing information of invention, discovery, use, market release, or evolution of the different objects of different object types. In accordance with an embodiment, the server 106 may be configured to store the metadata associated with the plurality of filmed shots 116A to 116F. The metadata associated with the plurality of filmed shots 116A to 116F may include, but are not limited to, information that may indicate a geo-location at which each of the plurality of filmed shots 116A to 116F are captured, artist information, information about the detected first set of objects, and the detected second set of objects. In accordance with an embodiment, the server 106 may be further configured to store a second video content where the second video content may include a plurality of filmed shots with associated metadata.

In accordance with an embodiment, the server 106 may be configured to receive a content request from the video editing device 102, via the communication network 108. The server 106 may be further configured to transmit the stored first video content 112, the first timeline information, the second timeline information, the metadata, and the second video content to the video editing device 102, via the communication network 108, based on the received content request. In accordance with an embodiment, the server 106 may be implemented as a cloud server, which may be utilized to execute aforementioned operations of the video editing device 102 through web applications, cloud applications, HTTP requests, repository operations, file transfer, gaming operations, and the like. Other examples of the server 106 may include, but are not limited to a database server, a file server, a web server, an application server, a mainframe server, a cloud server, or other types of server.

In accordance with an embodiment, the server 106 may be part of the video editing device 102. In accordance with an embodiment, the server 106 may be implemented as a plurality of cloud-based resources by use of several technologies that are well known to those skilled in the art. Further, the server 106 may be associated with a single or multiple service providers. A person with ordinary skill in the art will understand that the scope of the disclosure is not limited to implementation of the server 106 and the video editing device 102 as separate entities. In accordance with an embodiment, the functionalities of the server 106 may be implemented by the video editing device 102, without departure from the scope of the disclosure.

The communication network 108 may include a communication medium through which the video editing device 102 and the server 106 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the video editing device 102 may be configured to receive a first user input from the user 110. The first user input may include a request to perform a continuity check on the first video content 112. Examples of the first video content 112 may include, but are not limited to, movie content, a song video scene, multimedia content, animation content, interactive content and/or a combination thereof. The first video content 112 may be stored in a memory (shown in FIG. 2) of the video editing device 102. In accordance with an embodiment, the first video content 112 may include the set of filmed scenes 114A to 114B of a filmed sequence. The first filmed scene 114A may include the plurality of filmed shots 116A to 116C and the second filmed scene 114B may include another plurality of filmed shots 116D to 116F. The plurality of filmed shots 116A to 116C of the first filmed scene 114A and the plurality of filmed shots 116D to 116F of the second filmed scene 114B may be of certain duration (for example in seconds or minutes). In accordance with an embodiment, the first filmed shot 116A may include the sequence of image frames 118 and the second filmed shot 116B may include the sequence of image frames 120. In accordance with an embodiment, a number of image frames in the first filmed shot 116A and the second filmed shot 1168 may be based on a duration (or time length) of the first filmed shot 116A and the second filmed shot 1168. In some embodiments, the number of image frames may be based on a capture rate (or frame rate) of the video capturing device at the time of capture of each of the first filmed shot 116A and the second filmed shot 1168. The first filmed shot 116A and the second filmed shot 1168 may be captured by the video capturing device continuously over a time period. In some embodiments, the first filmed shot 116A and the second filmed shot 1168 may be captured by the video capturing device in a discontinuous manner (for example captured after certain time period say in hours, days or weeks).

In accordance with an embodiment, the first filmed shot 116A and the second filmed shot 1168 may further include shot identification information (for example a shot identification number). In accordance with an embodiment, the video editing device 102 may be configured to determine the first filmed shot 116A and the second filmed shot 1168 as consecutive shots of the first filmed scene 114 based on the shot identification information of each of the first filmed shot 116A and the second filmed shot 1168. In some embodiments, the video editing device 102 may be configured to determine the first filmed shot 116A and the second filmed shot 1168 as the consecutive shots of the first filmed scene 114 based on clapper board information used during the capture of each of the first filmed shot 116A and the second filmed shot 1168. The clapper board information may include, but is not limited to, date-time information of capture, a scene number, a take number, a title of video content, or a name of a director of video content. In some embodiments, the video editing device 102 may be configured to receive one or more user inputs from the user 110 to select the first filmed shot 116A and the second filmed shot 116B as the consecutive shots before the receipt of the first user input to initiate the continuity check on the first video content 112. In some embodiments, the video editing device 102 may be configured to receive the one or more user inputs from the user 110 to arrange a plurality of filmed shots of the set of filmed scenes on an editing timeline (not shown) displayed on the display screen 104 of the video editing device 102. The one or more user inputs may include selection of the first filmed shot 116A and the second filmed shot 116B as the consecutive shots based on the arrangement. In accordance with an embodiment, the video editing device 102 may be configured to automatically arrange and select the first filmed shot 116A and the second filmed shot 116B as the consecutive shots based on the shot identification information or the capture timing information.

In accordance with an embodiment, the video editing device 102 may be further configured to extract the first image frame 122 of the first filmed shot 116A and the second image frame 124 of the second filmed shot 116B. In accordance with an embodiment, the first image frame 122 may be the last frame of the sequence of image frames 118 of the first filmed shot 116A and the second image frame 124 may be the first frame of the sequence of image frames 120 of the second filmed shot 116B. The video editing device 102 may perform the continuity check on the first image frame 122 of the first filmed shot 116A and the second image frame 124 of the second filmed shot 116B.

In accordance with an embodiment, the video editing device 102 may be further configured to detect a first set of objects (shown in FIG. 3) from the extracted first image frame 122 and a second set of objects (shown in FIG. 3) from the extracted second image frame 124. Examples of the first set of objects and the second set of objects may include, but are not limited to, humans, animals, plants, or other non-living entities.

In accordance with an embodiment, the video editing device 102 may be further configured to identify a first object from each of the first set of objects and the second set of objects based on an object type of the first object. The object type of the first object in the first set of objects and the second set of objects is same. The video editing device 102 may be further configured to determine a deviation of a first visual attribute of the first object in the first image frame 122 from a second visual attribute of the first object in the second image frame 124. The first visual attribute and the second visual attribute may be of same type. Examples of the first visual attribute and the second visual attribute may include, but are not limited to, a shape, a size, a dimension, a color, a brightness value, a contrast value, a texture, an orientation, an angle of tilt, a posture, or textual information. The deviation between the first visual attribute of the first object in the first image frame 122 and the second visual attribute of the first object in the second image frame 124 may be described in detail, for example, FIG. 3.

The video editing device 102 may be configured to determine the deviation to check the continuity of the first object in both the first image frame 122 and the second image frame 124. In accordance with an embodiment, the continuity of the first object may be determined based on the presence of the first object with similar set of visual attributes in both the first image frame 122 and the second image frame 124 of the first filmed shot 116A and the second filmed shot 116B respectively.

In accordance with an embodiment, the video editing device 102 may be further configured to generate notification information associated with the first object based on the determined deviation. In accordance with an embodiment, the video editing device 102 may be further configured to control the display screen 104 to output the generated notification information associated with the first object in the first image frame 122 and the second image frame 124. The output notification information may be described in detail, for example in FIGS. 4A and 4B. Thus, the notification information about the discontinuity of the first object between the first image frame 122 and the second image frame 124 may allow the user 110 (for example the editor) to take appropriate decisions either to reshoot the first filmed shot 116A and the second filmed shot 116B or to apply one or more known image processing techniques on the first object to maintain the continuity of the first object between the first filmed shot 116A and the second filmed shot 116B. The user 110 may also take decisions to discard the notification information in case the discontinuity of the first object is intentional at the time of capture of the first filmed shot 116A and second filmed shot 116B.

In accordance with an embodiment, the video editing device 102 may be configured to perform the continuity check on different consecutive or adjoining filmed shots of each of the set of filmed scenes 114A to 114B of the first video content 112 and generate the notification information for different objects based on the performed continuity check. Thus, the video editing device 102 may provide accurate and automatic detection of continuity errors (or mistakes) in the captured first video content 112 which further reduces a substantial manual effort of the user 110. The accurate and automatic detection of the continuity errors may further assist the user 110 to improve overall quality of the first video content 112 and enhance the credibility of the user 110 among the audiences of the first video content 112.

Figure 2:
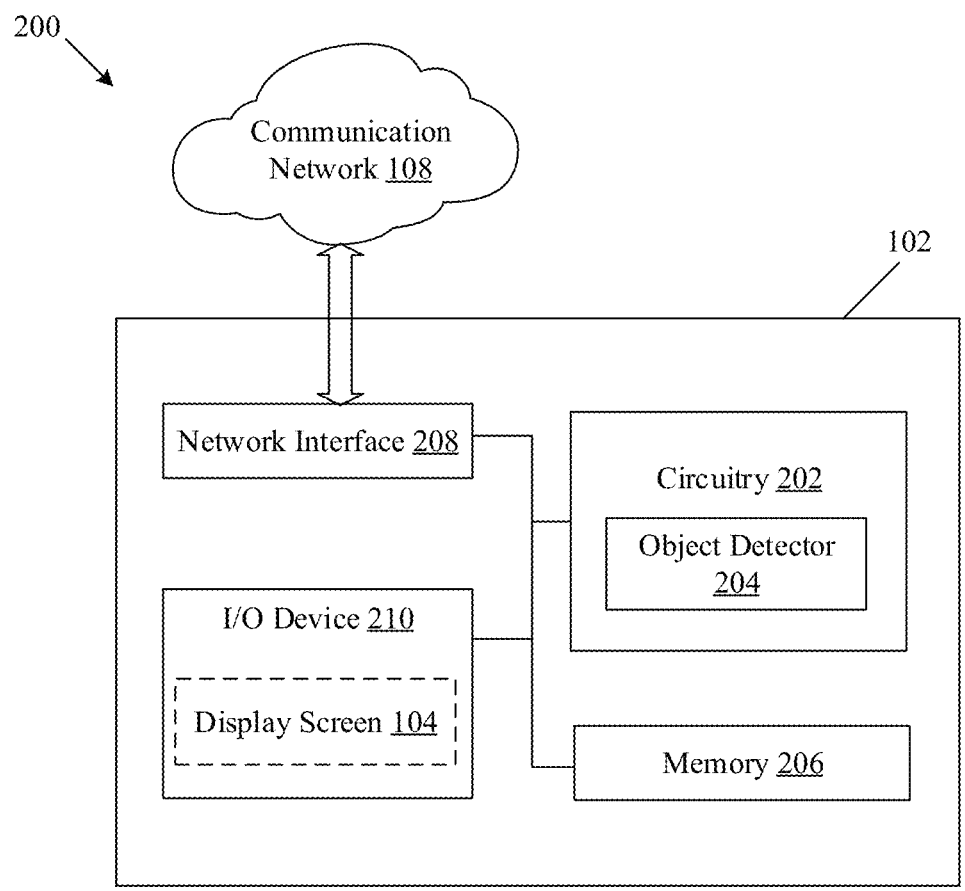
FIG. 2 is a block diagram that illustrates an exemplary video editing device for control of notifications for deviations in depiction of different objects in filmed shots of video content, in accordance with an embodiment of the disclosure.

FIG. 2 is a block diagram that illustrates an exemplary video editing device for control of notifications for deviations in depiction of different objects in filmed shots of video content, in accordance with an embodiment of the disclosure. FIG. 2 is explained in conjunction with elements from FIG. 1. With reference to FIG. 2, there is shown the video editing device 102. The video editing device 102 may include circuitry 202 which may further include the object detector 204. The video editing device 102 may further include a memory 206, network interface 208, and an input/output (I/O) device 210. The I/O device 210 may include the display screen 104. The circuitry 202 may be communicatively coupled to the memory 206, the network interface 208, and the I/O device 210. The circuitry 202 may be configured to communicate with the server 106, by use of the network interface 208.

The circuitry 202 may comprise suitable logic, circuitry, and interfaces that may be configured to execute a set of instructions stored in the memory 206. The circuitry 202 may be configured to receive the first user input (i.e. to perform the continuity check) from the user 110 via the I/O device 210. The circuitry 202 may be further configured to determine the continuity of different objects included in the consecutive filmed shots in the filmed scene based on the received first user input. In accordance with an embodiment, the circuitry 202 may be configured to analyze different objects in the first video content 112 to determine the factual errors. The circuitry 202 may be implemented based on a number of processor technologies known in the art. Examples of the circuitry 202 may be a Graphical Processing Unit (GPU), a Central Processing Unit (CPU), X86-based processor, a Reduced Instruction Set Computing (RISC) processor, an Application-Specific Integrated Circuit (ASIC) processor, a Complex Instruction Set Computing (CISC) processor, other processors, and the like.

The object detector 204 may comprise suitable logic, circuitry, and interfaces that may be configured to detect the first set of objects and the second set of objects from the first image frame 122 of the first filmed shot 116A and the second image frame 124 of the second filmed shot 116B respectively. In accordance with an embodiment, the object detector 204 may be further configured to identify different object types of the detected the first set of objects and the second set of objects. The detected first set of objects and the second set of objects may correspond to at least one of a two-dimensional (2D) object or a three-dimensional (3D) object. In accordance with an embodiment, the object detector 204 may be configured to detect the first set of objects, the second set of objects, and related object types based on object detection and classification technique. The object detection and classification technique may be based on, but not limited to, numerical computation techniques using data flow graphs, a deep neural network (DNN) architecture, such as a convolutional neural network (CNN), a CNN-recurrent neural network (CNN-RNN), R-CNN, Fast R-CNN, Faster R-CNN, and (You Only Look Once) YOLO network. In some embodiments, the object detector 204 may implement other object identification techniques, such as human shape-based object boundary identification, pre-specified shape-based or template based object identification, such as by use of Sobel operator or Prewitt operator. Examples of implementations of the object detector 204 may be a specialized circuitry, a GPU, a RISC processor, an ASIC processor, a CISC processor, a microcontroller, a central processing unit (CPU), or other control circuits.

In certain embodiments, the object detector 204 may be implemented based on a DNN learning model trained for detection and identification of objects in image frames. In such implementations, the object detector 204 may be a specialized DNN circuitry and/or may implement a supplementary accelerator circuitry, to boost training and/or speed of detection of objects in image frames captured by the video capturing device. The accelerator circuitry may be an on-device (offline) accelerator circuitry (not shown in FIG. 1) or a server-end (online) accelerator circuitry (i.e., available on a cloud server).

The memory 206 may comprise suitable logic, circuitry, and interfaces that may be configured to store the first video content 112, the first timeline information which may indicate the era related to the first video content 112. In accordance with an embodiment, the memory 206 may be configured to store the notification information associated the first object for which the video editing device 102 determines the discontinuity or the factual error. In some embodiments, the memory 206 may perform functionalities similar to the data storage system 102A shown in FIG. 1. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may comprise suitable logic, circuitry, and/or interfaces that may be configured to facilitate communication between the video editing device 102 and the server 106, via the communication network 108. The network interface 208 may be implemented by use of various known technologies to support wired or wireless communication of the video editing device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer.

The I/O device 210 may comprise suitable logic, circuitry, and/or interfaces that may be configured to act as an I/O channel/interface between the user 110 and the different operational components of the video editing device 102. The I/O device 110 may be configured to receive the first user input from the user 110 to perform the continuity check on the first video content 112. The I/O device 110 may be further configured to display the notification information associated the first object for which the video editing device 102 determines the discontinuity or the factual error. The I/O device 210 may comprise various input and output devices, which may be configured to communicate with different operational components of the device 102. Examples of the I/O device 210 may include, but are not limited to, a touch screen, a keyboard, a mouse, a joystick, a microphone, and a display screen (for example the display screen 104).

The functions or operations executed by the video editing device 102, as described in FIG. 1, may be performed by the circuitry 202 and the object detector 204. The operations executed by the circuitry 202 and the object detector 204 are further described, for example, in the FIGS. 3, 4A, 4B, 5, 6 and 7.

Figure 3:
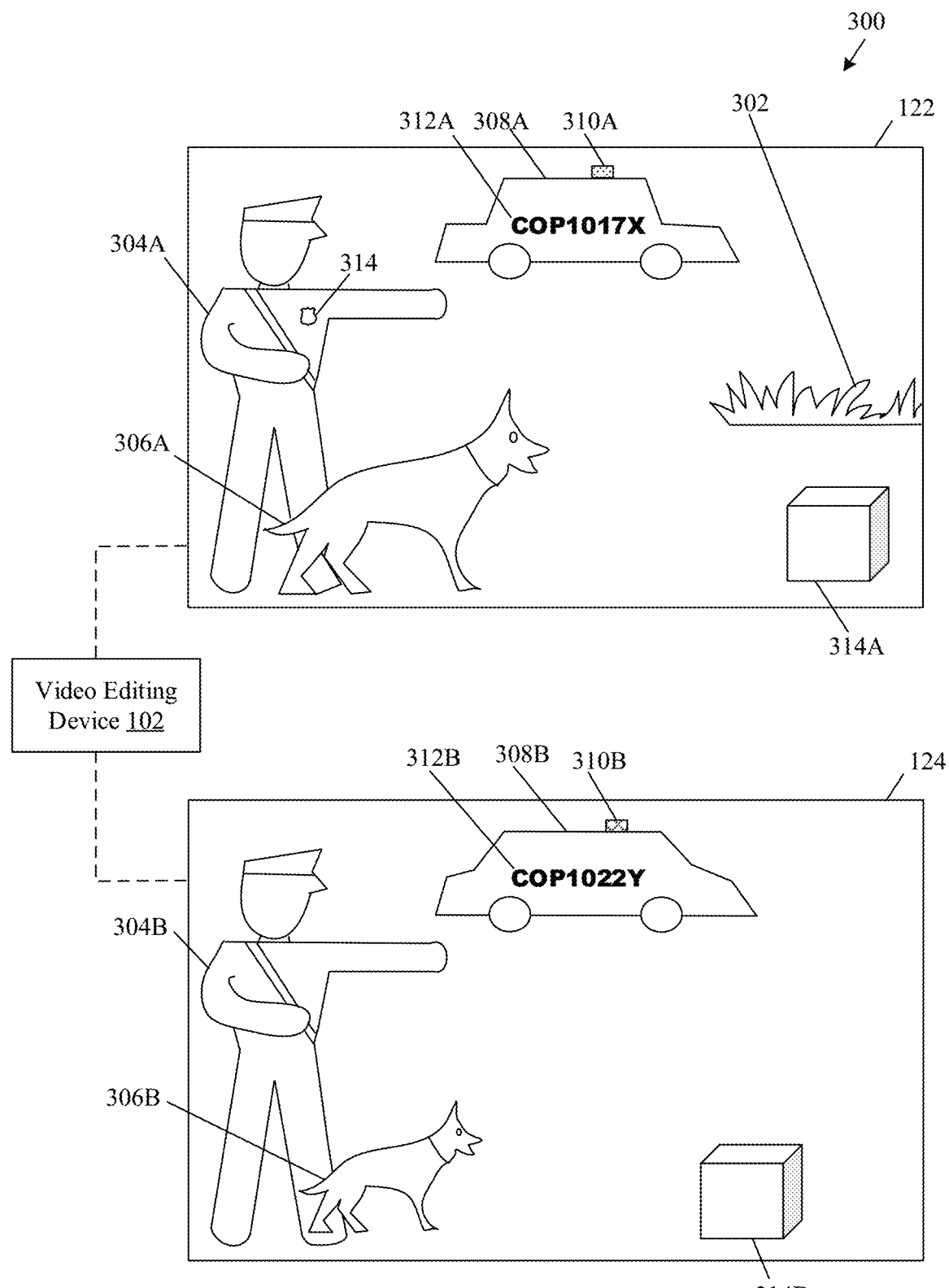
FIG. 3 illustrates a first exemplary scenario for control of notifications for deviations in depiction of different objects in filmed shots of video content by the video editing device of FIG. 2, in accordance with an embodiment of the disclosure.

FIG. 3 illustrates a first exemplary scenario for control of notifications for deviations in depiction of different objects in filmed shots of video content by the video editing device of FIG. 2, in accordance with an embodiment of the disclosure. FIG. 3 is explained in conjunction with elements from FIG. 1 and FIG. 2. With reference to FIG. 3, there is shown a first scenario 300.

In the first scenario 300, there is shown the first image frame 122 of the first filmed shot 116A and the second image frame 124 of the second filmed shot 116B. In accordance with an embodiment, the first filmed shot 116A and the second filmed shot 116B may correspond to same filmed scene (for example the first filmed scene 114A). The first filmed shot 116A and the second filmed shot 116B may be the consecutive or adjoining shots of the first filmed scene 114A. In accordance with an embodiment, the first image frame 122 may be the last frame of the sequence of image frames 118 of the first filmed shot 116A and the second image frame 124 may be the first frame the sequence of image frames 120 of the second filmed shot 116B. In accordance with an embodiment, the first filmed shot 116A and the second filmed shot 116B may correspond to different filmed scenes of the first video content 112, where the different filmed scene may correspond to same context. For example, different scenes are captured at different time (or with different scripts or dialogues) but with similar objects in background as the same context.

In FIG. 3, there is further shown the video editing device 102 which is configured to perform the continuity check on the first image frame 122 and the second image frame 124 of the consecutive shots (the first filmed shot 116A and the second filmed shot 116B). The video editing device 102 may be configured to perform the continuity check to verify the consistency (i.e. presence or visual attributes) of different objects between the first filmed shot 116A and the second filmed shot 116B.

The circuitry 202 may be configured to initiate the continuity check between each consecutive shots of the set of filmed scenes 114A to 114B based on the receipt of the first user input from the user 110 (for example the editor of the first video content 112). In the continuity check, the circuitry 202 may be configured to extract the first image frame 122 of the first filmed shot 116A and the second image frame 124 of the second filmed shot 116B. In accordance with an embodiment, for the extraction, the circuitry 202 may be configured to read pixel information associated with the first image frame 122 and the second image frame 124 from the memory 206 in which the first video content 112 is stored. In accordance with an embodiment, the circuitry 202 may be further configured to provide the extracted first image frame 122 and the extracted second image frame 124 to the object detector 204.

In accordance with an embodiment, the object detector 204 may be further configured to detect a first set of objects (such as 302, 304A, 306A, 308A, 310A, 312A, and 314A in FIG. 3) from the extracted first image frame 122. The object detector 204 may be further configured to detect a second set of objects (such as 304B, 306B, 308B, 310B, 312B, and 314B in FIG. 3) from the extracted second image frame 124. The object detector 204 may be further configured to classify the detected objects into different object types based on different object detection techniques as described in FIG. 1. With respect to FIG. 3, the object detector 204 may be configured to detect and classify a first object 304A with the object type as a human, a second object 306A with the object type as a dog, a third object 308A with the object type as a car, a fourth object 310A with the object type as a lighting device, a fifth object 314A with the object type as a box, and a sixth object 302 with the object type as a plant from the first set of objects in the first image frame 122. The object detector 204 may be further configured to detect and classify a seventh object 304B with the object type as the human, an eight object 306B with the object type as the dog, a ninth object 308B with the object type as the car, a tenth object 3108 with the object type as the lighting device, and an eleventh object 314B with the object type as the box from the second set of objects in the second image frame 124. The object detector 204 may be configured to determine pixel coordinates of each of the first set of objects and the second set of objects in the first image frame 122 and the second image frame 124 respectively. The pixel coordinates may be in X-axis and Y-axis based on a resolution at which the first image frame 122 and the second image frame 124 are captured by the video capturing device.

In accordance with an embodiment, the circuitry 202 may be configured to receive the detected object type and the determined pixel coordinates of each of the first set of objects and the second set of objects from the object detector 204. The circuitry 202 may be further configured to identify the first object 304A in the first image frame 122 and the seventh object 304B in the second image frame 124 as same objects based on the object type and the determined pixel coordinates of both the first object 304A and the seventh object 304B. In accordance with an embodiment, the object detector 204 may be configured to detect and classify different sub-objects within detected objects. For example, the object detector 204 may be configured to detect a twelfth object 314 as insignia within the detected first object 304A (as human) in the first image frame 122. In accordance with an embodiment, the circuitry 202 may be configured to receive the twelfth object 314 in the first set of objects from the object detector 204. The circuitry 202 may be configured to determine that the twelfth object 314 (for example insignia) in the first set of objects is missing or absent in the detected second set of objects based on the object type and the pixel coordinates of the twelfth object 314 in the first image frame 122. The circuitry 202 may be further configured to generate the notification information for the user 110. The notification information may indicate the discontinuity or inconsistency of the twelfth object 314 between the first image frame 122 (for example last frame of the first filmed shot 116A) and the second image frame 124 (for example first frame of the second filmed shot 116B). The notification information may be an alert or an error message about the discontinuity of the twelfth object 314 (for example insignia) for the user 110. The circuitry 202 may be configured to control the display screen 104 to output the generated notification information associated with the twelfth object 314. The details of the notification information may be described in detail, for example, in FIGS. 4A and 4B. In accordance with an embodiment, the circuitry 202 may be configured to control a speaker (not shown) associated with the video editing device 102 to output the generated notification in an audio form.

In accordance with an embodiment, the circuitry 202 may be further configured to determine one or more visual attributes of the detected first set of objects and the second set of objects. In some embodiments, the circuitry 202 may be configured to determine the one or more visual attributes based on the pixel information of each pixel in the first image frame 122 and the second image frame 124. The pixel information of may include, but are not limited to, a brightness value, a contrast value, or a color value. In some embodiments, the circuitry 202 may be configured to determine the one or more visual attributes based on the determined pixel coordinates of each of the first set of objects and the second set of objects. Examples of the one or more visual attributes of the detected first set of objects and the second set of objects may include, but are not limited to, a shape, a size, a dimension, a color, a brightness value, a contrast value, a texture, an orientation, an angle of tilt, a posture, or textual information.

In accordance with an embodiment, the circuitry 202 may be further configured to determine the one or more visual attributes for each of the first object 304A and the seventh object 304B (i.e. same objects). The circuitry 202 may be configured to determine a deviation in at least one visual attribute of the determined one or more visual attributes for each of the first object 304A and the seventh object 304B. With respect to FIG. 3, the one or more visual attributes of the first object 304A and the seventh object 304B are same. Thus, the circuitry 202 may be configured to detect the consistency (or continuity) in the one or more visual attributes of the first object 304A and the seventh object 304B between the first image frame 122 and the second image frame 124.

The circuitry 202 may be further configured to identify the second object 306A in the first image frame 122 and the eight object 306B in the second image frame 124 as same objects (for example dog) based on the object type and the determined pixel coordinates of both the second object 306A and the eight object 306B. The circuitry 202 may be further configured to determine the one or more visual attributes of the second object 306A and the eight object 306B. With respect to FIG. 3, the circuitry 202 may determine the deviation in size between the second object 306A and the eight object 306B. The circuitry 202 may be further configured to generate the notification information associated with the second object 306A (or the eight object 306B) based on the deviation in size. The deviation in size between the second object 306A and the eight object 306B may indicate the discontinuity or inconsistency between the first image frame 122 of the first filmed shot 116A and the second image frame 124 of the second filmed shot 116B.

Similarly, with respect to FIG. 3, the circuitry 202 may determine a deviation in shape between the third object 308A (as car) in the first image frame 122 and the ninth object 308B (similar to the third object 308A) in the second image frame 124. The circuitry 202 may be further configured to determine a deviation in color between the fourth object 310A (as the lighting device) in the first image frame 122 and the tenth object 310B in the second image frame 124.

In accordance with an embodiment, the object detector 204 may be configured to detect textual information in the detected first set of objects and the second set of objects. In accordance with an embodiment, the object detector 204 may detect the textual information based on one or more text recognition or optical character recognition techniques. The object detector 204 may be further configured to provide the detected textual information in each of the first set of objects and the second set of objects to the circuitry 202. The circuitry 202 may be further configured to compare the textual information of similar objects in the first image frame 122 and the second image frame 124 to determine a deviation in the textual information. With respect to FIG. 3, the circuitry 202 may determine a deviation between first textual information 312A (for example "COP1017X") in the third object 308A and second textual information 312B (for example "COP1022Y") in the ninth object 308B. The circuitry 202 may be further configured to generate the notification information associated with the third object 308A (or the ninth object 308B) based on the determined deviation between the first textual information 312A and the second textual information 312B. Further, with respect to FIG. 3, the circuitry 202 may determine that the sixth object 302 (as plant) in the first set of objects is absent or missing in the second set of objects based on the detected object type of each of the first set of objects and the second set of objects. The circuitry 202 may be configured to generate the notification information to indicate the discontinuity of the sixth object 302 between the first image frame 122 and the second image frame 124. Thus, the video editing device 102 may provide automatic and accurate generation of the notification information for the discontinuities (either in presence or in at least one visual attributes) of the objects between the consecutive shots. The automatic and accurate generation of the notification information ensures considerable time saving in the identification of the discontinuities (or the continuity errors) and further ensures improvement in the overall quality of the first video content 112.

In accordance with an embodiment, the circuitry 202 may be further configured to determine a position deviation of each of the first set of objects in the first image frame 122 with respect to similar object in the second set of objects in the second image frame 124. The circuitry 202 may be configured to determine the position deviation based on the pixel coordinates of each of the first set of objects and the second set of objects. With respect to FIG. 3, the circuitry 202 may be configured to identify the position deviation between the fifth object 314A (as box) in the first image frame 122 and the eleventh object 314B (similar to the fifth object 314A). The position deviation between the fifth object 314A and the eleventh object 314B may indicate a change in position or movement of the fifth object 314A (or the eleventh object 314B) between the first filmed shot 116A and the second filmed shot 116B. In accordance with an embodiment, the circuitry 202 may be configured to generate the notification information about the fifth object 314A (or the eleventh object 314B) based on the detected position deviation. The circuitry 202 may be further configured to control the display screen 104 to display the notification information about the position deviation to the user 110. Based on the notification information about the position deviation, the user 110 may take decision to reshoot the second filmed shot 116B by correction of the position of the eleventh object 314B and further avoid position discontinuity between the fifth object 314A and the eleventh object 314B. The user 110 may use different image processing or image editing techniques to correct the position of the eleventh object 314B in the second image frame 124. The user 110 may also ignore the notification information about the fifth object 314A (or the eleventh object 314B) in case, the position deviation between the fifth object 314A and the eleventh object 314B was intentional at the time of capture of the second filmed shot 116B. For example, a director or a camera man may change a position or location of a particular object between the consecutive shots intentionally based on a script of the first filmed scene 114A while the capture of the first video content 112. In another example, in case the director or the camera man changes a zoom of the video capturing device at the time of capture of the second filmed shot 116B with respect to the first filmed shot 116A, then the deviation in the one or more visual attributes (for example size or dimension) may be considered intentional by the user 110.

In accordance with an embodiment, the circuitry 202 may be configured to determine the position deviation between each of the first set of objects and the corresponding similar objects of the second set of objects based on the context of the first filmed scene 114A (i.e. which includes the first filmed shot 116A and the second filmed shot 116B). The circuitry 202 may be configured to analyze a plurality of image frames previous to the first image frame 122 (or a plurality of filmed shots previous to the first filmed shot 116A) to determine the context of the first filmed scene 114A. In accordance with an embodiment, the circuitry 202 may be configured to determine the pixel coordinates of different objects in the plurality of image frames to determine the context of the first filmed scene 114A. For example, in case of a moving scene (such as a dance or a song scene as context) where frequent movement in the objects and the sub-objects are captured between the consecutive shots, the circuitry 202 may be configured to discard the position deviation (between the first set of objects and the corresponding similar objects of the second set of objects) to generate the notification information for the user 110. Thus, the video editing device 102 may provide the intelligent continuity check of the objects between the consecutive shots. Such intelligent continuity check performed by the video editing device 102 may provide accurate continuity errors to the user 110 in lesser time. The user 110 may further analyze and correct all the continuity errors to improve the quality of the first video content 112 finally released after editing phase.

Figure 4A:
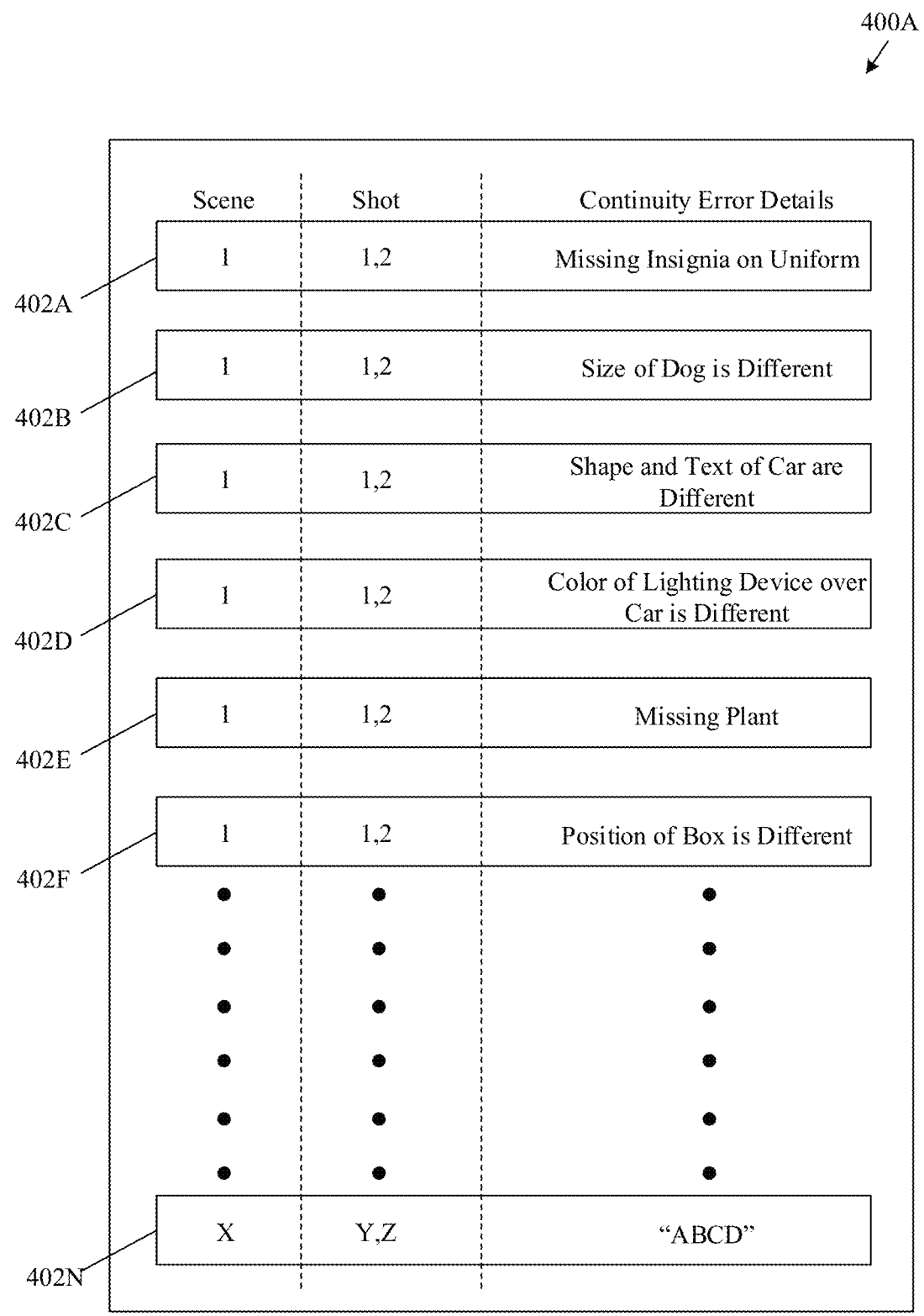
FIGS. 4A and 4B, collectively, illustrate a user interface to display notifications for deviations in depiction of different objects in filmed shots of video content by the video editing device of FIG. 2, in accordance with an embodiment of the disclosure.
Figure 4B:
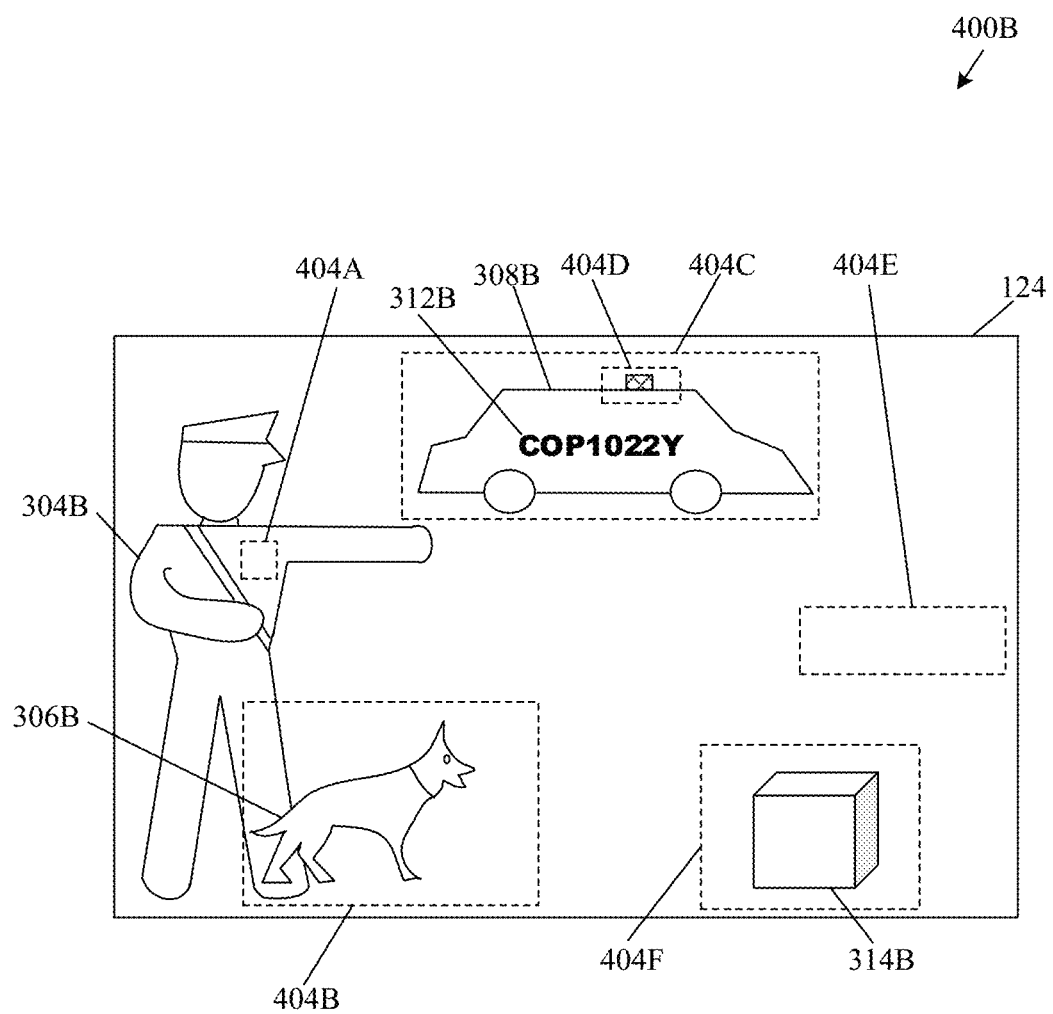

FIGS. 4A and 4B, collectively, illustrate a user interface to display notifications for deviations in depiction of different objects in filmed shots of video content by the video editing device of FIG. 2, in accordance with an embodiment of the disclosure. FIGS. 4A and 4B are explained in conjunction with elements from FIGS. 1, 2 and 3. With reference to FIG. 4A, there is shown a first user interface (UI) 400A displayed on the display screen 104.

In accordance with an embodiment, the first user interface (UI) 400A may indicate the notification information generated based on the continuity check executed by the circuitry 202 on the consecutive shots of the set of filmed scenes 114A to 114B of the first video content 112. With respect to FIG. 4A, the first user interface 400A may indicate the notification information generated based on the continuity check executed between the first set of objects and the second set of objects in the first image frame 122 and the second image frame 124 respectively, as described in detail, for example, in FIG. 3. The notification information may indicate the discontinuity or the inconsistency between the first set of objects and the second set of objects in the first image frame 122 and the second image frame 124. In accordance with an embodiment, the notification information may include identifier of the first filmed scene 114A in which one or more discontinuities of objects are detected by the video editing device 102. The identifier of the first filmed scene 114A may indicate a scene number in the first video content 112. In some embodiments, the notification information may further include identification information of the first filmed shot 116A and the second filmed shot 116B between which the one or more discontinuities of objects are detected by the video editing device 102. The identification information may indicate a shot number of the first filmed scene 114A which may include the first filmed shot 116A and the second filmed shot 116B. In accordance with an embodiment, the notification information may include details of the discontinuities (or the continuity errors). The details of the discontinuities may include the object type and the deviation in the one or more visual attributes of the first set of objects and the second set of objects.

With respect to FIG. 4A, there is shown a plurality of UI options 402A to 402N which may indicate the generated notification information displayed in a tabular form on the display screen 104. Each of the plurality of UI options 402A to 402N may display the generated notification information. In accordance with an embodiment, each of the plurality of UI options 402A to 402N may indicate the identifier of the first filmed scene 114A, the identification information of the first filmed shot 116A and the second filmed shot 1168, and the details of the detected discontinuities.

In accordance with an embodiment, the plurality of UI options 402A to 402N may include a first UI option 402A which may indicate the discontinuity about the twelfth object 314 (for example insignia) between the first image frame 122 and the second image frame 124 as described in FIG. 3. For example, the first UI option 402A may indicate an error message which may include the details of the continuity errors with the twelfth object 314 as "Missing Insignia on Uniform" in a filmed scene number "1" (as the identifier of the first filmed scene 114A) and in between the consecutive shots with number 1 and 2 (as the identification information of the first filmed shot 116A and the second filmed shot 116B).

Similarly, the plurality of UI options 402A to 402N may include a second UI option 402B which may include the error message. The error message may indicate the discontinuity (i.e. deviation in size) associated with the second object 306A and the eight object 306B (with the object type as dog) as described in FIG. 3. The error message may also indicate a production error in depiction of the eight object 306B in the second image frame 124. For example, the second UI option 402B may indicate the details of the continuity error of the eight object 306B as "Size of dog is different" with the identifier of the first filmed scene 114A as "1" and the identification information of the first filmed shot 116A and the second filmed shot 1168 as "1 and 2". With respect to FIG. 4A, the plurality of UI options 402A to 402N may include a third UI option 402C, a fourth UI option 402D, a fifth UI option 402E, and a sixth UI option 402F. In accordance with an embodiment, the third UI option 402C may include the error message that may indicate the discontinuity (i.e. deviation in shape and textual information) associated with the third object 308A and the ninth object 308B (as car) between the first image frame 122 and the second image frame 124. For example, the third UI option 402C may indicate the details of the discontinuity of the third object 308A and the ninth object 308B as "Shape and text of car are different". The fourth UI option 402D may include the error message that may indicate the discontinuity (i.e. deviation in color) associated with the fourth object 310A and the tenth object 310B (as the lighting device). For example, the fourth UI option 402D may indicate the details of the discontinuity of the fourth object 310A and the tenth object 310B as "Color of lighting device over car is different". The fifth UI option 402E may indicate the details of the continuity error of the sixth object 302 as "Missing plant" with the filmed scene number as 1" and the consecutive shots as "1, 2". Further, the sixth UI option 402F may include the error message that may indicate the discontinuity (i.e. deviation in position) associated with the fifth object 314A and the eleventh object 314B (as the box). For example, the sixth UI option 402F may indicate the details of the discontinuity of the fifth object 314A and the eleventh object 314B as "Position of box is different".

In accordance with an embodiment, the circuitry 202 may be configured to add the notification information as metadata in the first video content 112. In some embodiments, the circuitry 202 may be configured to add the notification information as the metadata with the first filmed shot 116A or the second filmed shot 1168 which includes the inconsistent objects for which the notification information was generated. The added metadata in the first video content 112 may assist the user 110 to quickly refer different continuity mistakes (or inconsistent objects) while editing or rendering the first video content 112 at later stages.

In accordance with an embodiment, the circuitry 202 may be configured to receive the one or more user inputs from the user 110 to select one of the plurality of UI options 402A to 402N, via the I/O device 210. The circuitry 202 may be further configured to control the display screen 104 to display the corresponding shots or the corresponding image frame associated with the selected one of the plurality of UI options 402A to 402N. For example, in case the user 110 selects the third UI option 402C, the circuitry 202 may control the display screen 104 to display the first image frame 122 and the second image frame 124 which include the discontinuity (i.e. deviation in shape and text) of the third object 308A (or similar ninth object 308B) with the object type as car.

In accordance with an embodiment, the circuitry 202 may be configured to receive the one or more user inputs from the user 110, via the I/O device 210, to filter the displayed the plurality of UI options 402A to 402N. The circuitry 202 may be configured to filter the plurality of UI options 402A to 402N based on different factors. Examples of the factors may include, but are not limited to, scene number, shot number, object type, or one or more visual attributes. For example, the circuitry 202 may receive the one or more user inputs from the user 110 to filter and display one or more of the plurality of UI options 402A to 402N (i.e. generation notification information) for scene 1. In another example, the circuitry 202 may receive the one or more user inputs from the user 110 to filter and display one or more of the plurality of UI options 402A to 402N which include deviation in position, or missing objects, or human as object type. Thus, the display of selective discontinuities of the first video content 112 may assist the user 110 to identify actual continuity mistakes which should be corrected to enhance the quality and popularity of the first video content 112.

With respect to FIG. 4B, there is shown the generated notification information in a graphical form on the either of the first image frame 122 and the second image frame 124. In FIG. 4B, there is a shown a plurality of UI regions 404A to 404F as the notification information. The plurality of UI regions 404A to 404F may be a graphical overlay (for example a transparent boundary or region) over the first set of objects and the second set of objects in which the continuity errors have been detected or the notification information is generated by the circuitry 202 as described in detail, for example, in FIG. 3. Thus, such graphical representation of the notification information may assist the user 110 (as the editor) to identify the continuity errors in lesser time. Based on the displayed graphical representation of the notification information associated with different objects, the user 110 may further take appropriate decision either to reshoot the detected shot (with the continuity errors), correct the continuity errors using the known video editing techniques or just ignore the continuity error of a particular object (in case the discontinuity or the deviation was intentional at the time of capture of the shot).

Figure 5:
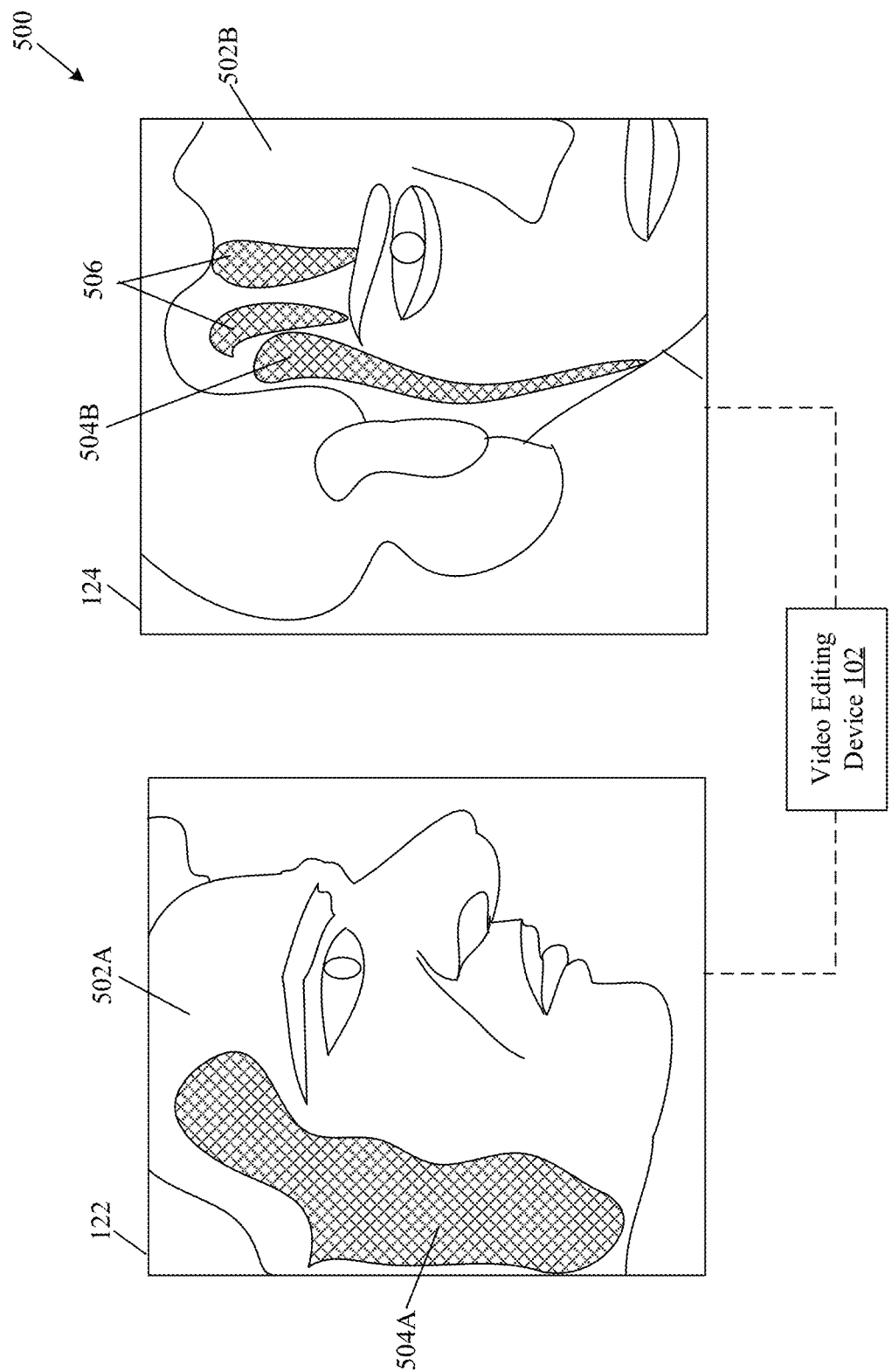
FIG. 5 illustrates a second exemplary scenario for control of notifications for deviations in depiction of different objects in filmed shots of video content by the video editing device of FIG. 2, in accordance with an embodiment of the disclosure.

FIG. 5 illustrates a second exemplary scenario for control of notifications for deviations in depiction of different objects in filmed shots of video content by the video editing device of FIG. 2, in accordance with an embodiment of the disclosure. FIG. 5 is explained in conjunction with elements from FIGS. 1, 2, 3, 4A, and 4B. With reference to FIG. 5, there is shown a second scenario 500.

In the second scenario 500, there is shown the first image frame 122 and the second image frame 124 on which the continuity check may be performed by the video editing device 102. The first image frame 122 may include a first facial object 502A (with the object type as human face) and the second image frame 124 may include a second facial object 502B (similar to the first facial object 502A). With respect to FIG. 5, the first image frame 122 and the second image frame 124 may be captured by the video capturing device at different angles with respect to the first facial object 502A. For example, the first image frame 122 in the first filmed shot 116A may be captured from a right-side (for example at zero-degree angle) of the first facial object 502A and the second image frame 124 in the second filmed shot 116B may be captured from a front-side (for example at ninety-degree angle) of the second facial object 502B.

In accordance with an embodiment, the first image frame 122 may include first angle information (for example zero-degree) which may indicate a first angle at which the first image frame 122 may be captured by the video capturing device. In accordance with an embodiment, the video capturing device may be at a first position (for example at a right-side of the first facial object 502A) to capture the first image frame 122. The second image frame 124 may include second angle information (for example ninety-degree) which may indicate a second angle at which the second image frame 124 may be captured by the video capturing device. In accordance with an embodiment, the video capturing device may be at a second position (for example at front-side of the second facial object 502B) to capture the second image frame 124. The second angle (at which the second image frame 124 may be captured) may be defined with respect to the first angle (at which the first image frame 122 may be captured). In accordance with an embodiment, each of the sequence of image frames 118 of the first filmed shot 116A may include the first angle information, and each of the sequence of image frames 120 of the second filmed shot 116B may include the second angle information.

In accordance with an embodiment, the object detector 204 may be configured to detect the first facial object 502A from the first image frame 122. The circuitry 202 may be configured to receive the detected first facial object 502A from the object detector 204. In accordance with an embodiment, the circuitry 202 may be further configured to generate a first three-dimensional (3D) image of the detected first facial object 502A based on the first angle information included in the first image frame 122. In some embodiments, the circuitry 202 may generate the first 3D image of the first facial object 502A using different 2D-3D conversion techniques. Example of such 2D-3D conversion techniques may include, but are not limited to, 3D reconstruction from multiple images using discrete linear transform (DLT), 3D reconstruction from 2D images using deep neural networks, 3D Reconstruction from 2D images using triangulation, or 3D reconstruction from monocular and stereo cues in 2D images.

In accordance with an embodiment, the object detector 204 may be further configured to detect the second facial object 502B from the second image frame 122. The circuitry 202 may be configured to receive the detected second facial object 502B from the object detector 204. In accordance with an embodiment, the circuitry 202 may be further configured to generate a second 3D image of the detected second facial object 502B based on the second angle information included in the second image frame 124.

In accordance with an embodiment, each of the sequence of image frames 118 may include the first angle information which indicate the first angle at which each of the sequence of image frames 118 are captured by the video capturing device. In some embodiments, a first plurality of image frames of the sequence of image frames 118 may be captured at a different angle in comparison to a second plurality of image frames of the sequence of image frames 118. For example, in case, the video capturing device is continuously moving at a particular direction (either in X-axis, Y-axis, or Z-axis) and with a particular speed, then the first plurality of image frames of the first filmed shot 116A may be captured at different angles with respect to the capture of the second plurality of image frames of the first filmed shot 116A. In accordance with an embodiment, a number of first plurality of image frames and a number of the second plurality of image frames captured at different angles may be based on the frame (or capture) rate of the video capturing device and the particular speed at which the video capturing device moves while capture of the first filmed shot 116A.

In accordance with an embodiment, each of the sequence of image frames 118 may include first motion information of the video capturing device. The first motion information may indicate a change in position of the video capturing device with respect to a first original position (for example a position of the video capturing device while capture of a first image frame of the sequence of image frames 118). The position may correspond to XYZ position of the video capturing device in a 3D physical space.

In accordance with an embodiment, the circuitry 202 may be configured to generate the first 3D image of the detected first facial object 502A (or the first set of objects in FIG. 3)

based on the first angle information or the first motion information associated with each of the sequence of image frames 118. Similarly, each of the sequence of image frames 120 of the second filmed shot 1168 may include second motion information of the video capturing device. The second motion information may indicate the change in the position of the video capturing device with respect to a second original position (for example a position of the video capturing device while capture of a first image frame of the sequence of image frames 120 of the second filmed shot 116B). In accordance with an embodiment, the circuitry 202 may be further configured to generate the second 3D image of the detected second facial object 502B (or the second set of objects in FIG. 3) based on the second angle information or the second motion information associated with each of the sequence of image frames 120 of the second filmed shot 1168.

In accordance with an embodiment, the circuitry 202 may be further configured to compare the generated first 3D image of the first facial object 502A (i.e. captured at the first angle) with the generated second 3D image of the second facial object 502B (i.e. captured at the second angle). The circuitry 202 may be further configured to detect a deviation in the one or more visual attributes of the generated first 3D image of the first facial object 502A and the generated second 3D image of the second facial object 502B. With respect to FIG. 5, the circuitry 202 may be configured to detect the deviation in texture or shape (for example texture or shape of blood) of the generated first 3D image of the first facial object 502A from the generated second 3D image of the second facial object 502B. With respect to FIG. 5, the texture or the shape of a first sub-object 504A (for example with the object type as blood mark) on the first facial object 502A is different from the texture or the shape of a second sub-object 504B (similar to the first sub-object 504A) on the second facial object 502B. Further, a third sub-object 506 (for example with the object type as blood mark) on the second facial object 502B in the second image frame 124 may be missing on the first facial object 502A in the first image frame 122.

In accordance with an embodiment, the circuitry 202 may be further configured to generate the notification information based on the deviation of the texture (or shape) of the first sub-object 504A from the second sub-object 504B. In some embodiments, the circuitry 202 may be configured to generate the notification information based on the detection of discontinuity (or absence) of the third sub-object 506 between the consecutive frames (i.e. the first image frame 122 and the second image frame 124). Thus, the 3D generation and comparison capability of the video editing device 102 provides automatic detection of discontinuities of objects even-though the objects were captured at different angles in the consecutive shots.

Figure 6:
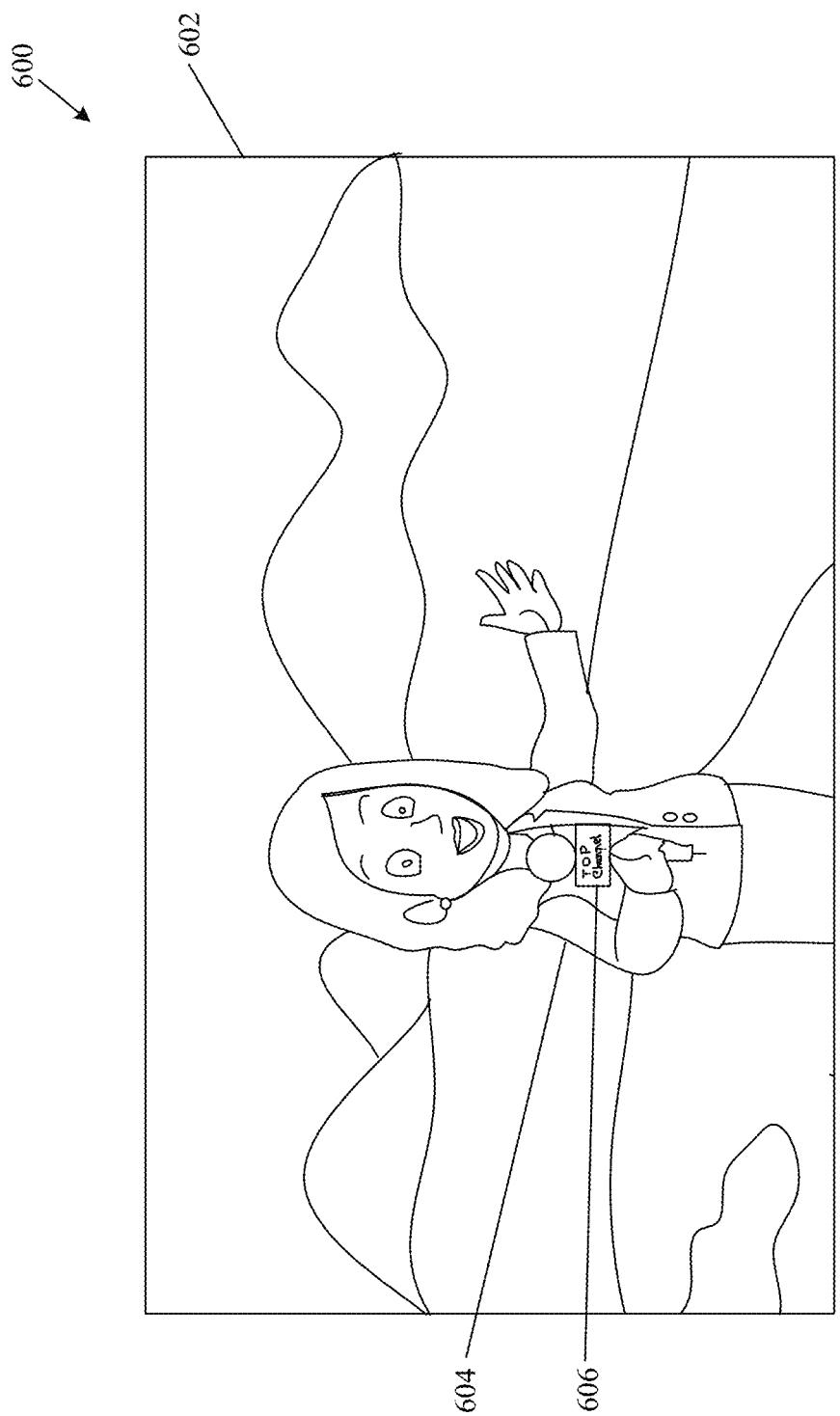
FIG. 6 illustrates a third exemplary scenario for control of notifications for factual errors in depiction of different objects in filmed shots of video content by the video editing device of FIG. 2, in accordance with an embodiment of the disclosure.

FIG. 6 illustrates a third exemplary scenario for control of notifications for factual errors in depiction of different objects in filmed shots of video content by the video editing device of FIG. 2, in accordance with an embodiment of the disclosure. FIG. 6 is explained in conjunction with elements from FIGS. 1, 2, 3, 4A, 4B, and 5. With reference to FIG. 6, there is shown a third scenario 600.

In the third scenario 600, there is shown a captured image frame 602 of a particular filmed shot of the first video content 112. The image frame 602 may include a first object 604 and a second object 606. In accordance with an embodiment, the first object 604 may correspond to an object type as a human (for example a news reporter) and the second object 606 may correspond to an object type as a handled microphone held by the first object 604. In FIG. 6, there is also shown text information printed on the second object 606. For example, the text information may correspond a name of organization (such as a news channel name) to which the first object 604 (for example the news reporter) may be associated.

In accordance with an embodiment, the circuitry 202 may be configured to receive a second user input from the user 110, via the I/O device 210, during the editing phase of the first video content 112. The second user input may include a request to perform a factual error check on the first video content 112. In response to the receipt of the second user input, the circuitry 202 may be configured to execute the factual error check on each image frame (for example the image frame 602) or each filmed shot of the first video content 112.

With respect to FIG. 6, the circuitry 202 may be configured to extract the image frame 602 from the first video content 112 stored in the memory 206. The object detector 204 may be configured to detect the object type of each of the first object 604 and the second object 606 from the extracted image frame 602. The object detector 204 may be further configured to detect the text information (for example "Top Channel" as shown in FIG. 6) associated with the second object 606 from the extracted image frame 602. In accordance with an embodiment, the circuitry 202 may be configured to receive the detected object type of each of the first object 604 and the second object 606, and the text information from the object detector 204. The circuitry 202 may be further configured to retrieve the first timeline information associated with the first video content. The first timeline information may indicate the era related to the first video content 112 or the era (for example a medieval era) depicted by the first video content 112. In accordance with an embodiment, the first timeline information may indicate a year or a decade based on which the first video content 112 may be captured. In some embodiments, the circuitry 202 may be configured to receive the first timeline information from the user 110, via the I/O device 210. The first timeline information may be included in the second user input received from the user 110.

In accordance with an embodiment, the circuitry 202 may be configured to send an image and the object type of each of the detected first object 604 and the second object 606, and the detected text information to the server 106. In accordance with an embodiment, the server may include a master database (not shown) which may store a plurality of objects with different object types. In some embodiments, the master database may include different versions of the plurality of objects. Different versions may indicate different changes (for example visual features) with respect to different objects. For example, the master database may store different object types for different television or mobile phone versions. In accordance with an embodiment, the master database may include the second timeline information associated with the plurality of objects, the object types or different versions. The second timeline information may indicate timing information of invention, discovery, use, market release, or evolution of the each of the plurality of objects, the object types or different versions. For example, the second timeline information of a mobile phone (or specific version or model) may indicate a year when the mobile phone was invented, first released in market, or used, or evolved. With respect to FIG. 6, the master database in the server 106 may store the second timeline information associated with the second object 606 (for example the handheld microphone) or associated with detected text information (for example "Top Channel").

In accordance with an embodiment, the server 106 may be configured to receive the image and the object type of each of the detected first object 604 and the second object 606, and the detected text information from the circuitry 202. The server 106 may be further configured to compare the detected first object 604, the second object 606, and the detected text information with the stored plurality of objects (or different versions) based on the object type of each of the detected first object 604 and the second object 606 and the stored object type of each of the stored plurality of objects. The server 106 may be further configured to identify an object from the stored plurality of objects based on the comparison where the object type of the identified object is similar to the object type of the received first object 604 (or the second object 606 with the associated text information). The server 106 may be further configured to retrieve the second timeline information of the identified object from the master database.

In accordance with an embodiment, the circuitry 202 may be further configured to receive the second timeline information of the identified object from the server 106. In some embodiments, the memory 206 may be configured to store images of the plurality of objects (or different versions), the associated object types and the associated second timeline information. The circuitry 202 may be configured to identify the object from the stored plurality of objects based on the comparison of the detected first object 604, the second object 606, and the detected text information with the stored plurality of objects (or different versions) based on corresponding object types. The circuitry 202 may be further configured to retrieve the second timeline information associated with the identified object.

In accordance with an embodiment, the circuitry 202 may be further configured to compare the first timeline information associated with the first video content 112 with the second timeline information associated with each of the detected first object 604 and the second object 606 in the extracted image frame 602. The circuitry 202 may be further configured to determine a deviation in the first timeline information from the second timeline information for each of the detected first object 604 and the second object 606. For example, in case the first timeline information indicates that the first video content 112 is related to the era (for example 1900), and the second timeline information of the second object 606 indicates that "handheld microphone" was used later (for example 1950), the circuitry 202 may identify the deviation between the first timeline information of the first video content 112 and the second timeline information of the second object 606 as the factual error in the image frame 602. In another example, in case, the second timeline information associated with the detected text information indicates that the "Top Channel" was started in 1970, the circuitry 202 may identify the deviation between the first timeline information of the first video content 112 from the second timeline information of the second object 606 as the factual error.

In accordance with an embodiment, the circuitry 202 may be further configured to generate the notification information associated with the second object 606 for which the factual error was detected. In accordance with an embodiment, the generated notification information may include the identifier of a filmed scene which includes the image frame 602, the identification information of the filmed shot which includes the image frame 602, and the details of the factual error of the second object 606. In accordance with an embodiment, the circuitry 202 may be configured to display the generated notification information on the display screen for the user 110 as shown in FIG. 4A. In some embodiments, the circuitry 202 may be configured to control the display screen 104 to display the graphical overlay (as shown in FIG. 4B) over the second object 606 for which the factual error was detected.

In accordance with an embodiment, the circuitry 202 may be configured to detect the factual errors for each detected object included in each image frame of each filmed shot of the first video content 112. The circuitry 202 may be further configured to generate the notification information for each object for which the circuitry 202 detects the factual error. Based on the generated notification information about the factual error, the user 110 (for example editor) may take decision either to reshoot the filmed shot by removal of the object for which the factual error was detected or edit the object using the known image processing techniques before the finalization of the first video content 112 for the audiences. Thus, the detection of the factual errors by the video editing device 102 may enhance the overall quality of the first video content and the credibility of the user 110 (as editor).

Figure 7:
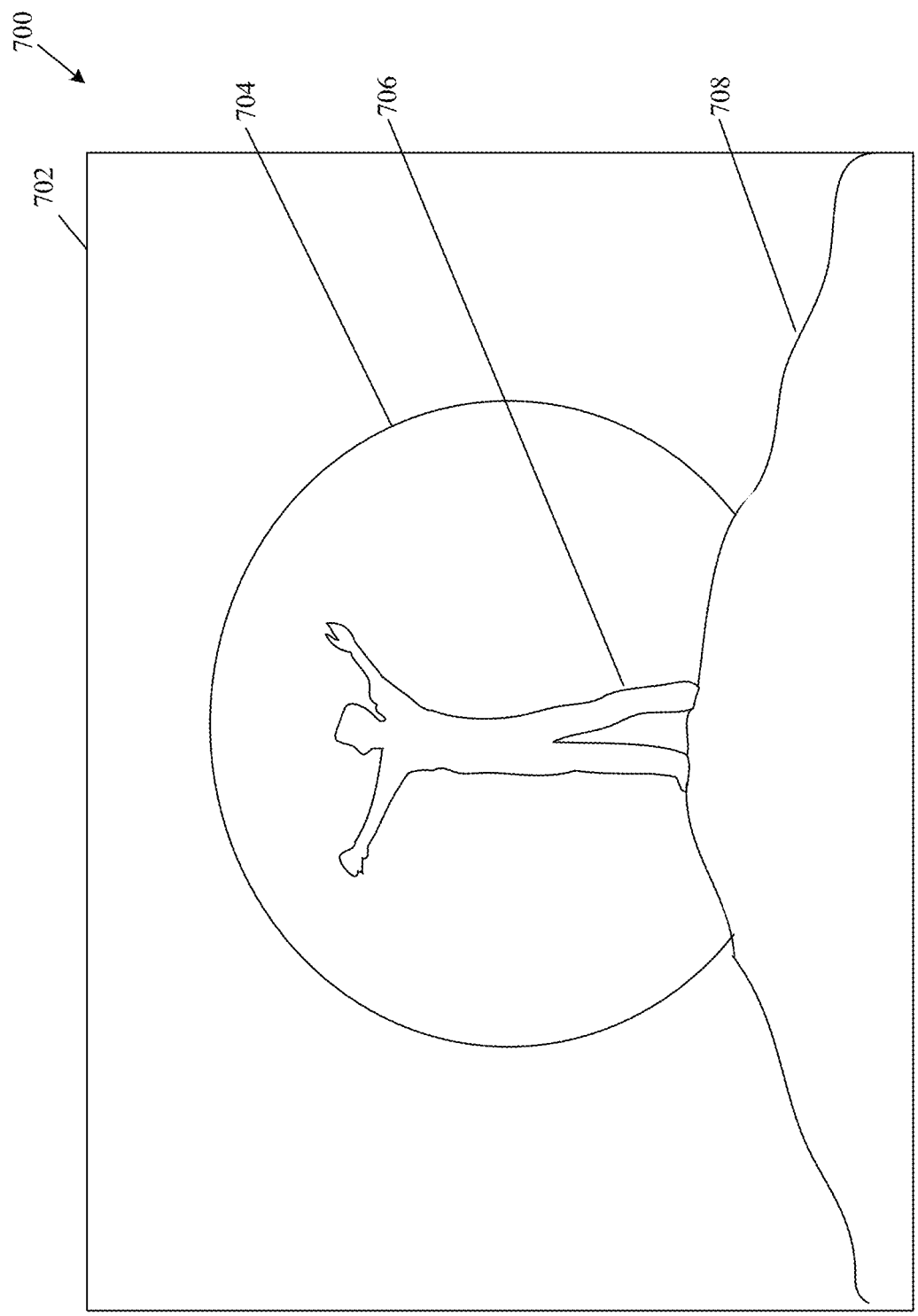
FIG. 7 illustrates a fourth exemplary scenario for control of notifications for duplicacy in depiction of different objects in filmed shots of video content by the video editing device of FIG. 2, in accordance with an embodiment of the disclosure.

FIG. 7 illustrates a fourth exemplary scenario for control of notifications for duplicacy in depiction of different objects in filmed shots of video content by the video editing device of FIG. 2, in accordance with an embodiment of the disclosure. FIG. 7 is explained in conjunction with elements from FIGS. 1, 2, 3, 4A, 4B, 5, and 6. With reference to FIG. 7, there is shown a fourth scenario 700.

In the fourth scenario 700, there is shown a captured image frame 702 of a particular filmed shot of the first video content 112. The image frame 702 may include a first object 704, a second object 706, and a third object 708. The first object 704 may correspond to the object type as a sun, the second object 706 may correspond to the object type as a human (for example a celebrity), and the third object 708 may correspond to the object type as a mountain. In accordance with an embodiment, the detected object type of each of the first object 704, the second object 706, and the third object 708 may be a first metadata. In some embodiments, the image frame 702 may include details associated with the detected first object 704, the second object 706, and the third object 708 as the first metadata. In some embodiments, the circuitry 202 may be configured to determine the details as the first metadata based on the analysis of the detected objects. Examples of the details, may include, but are not limited to, a size of an object, a dimension of an object, an object type of an object, a geo-location at which the image frame 702 was captured, a posture of an object, an orientation of an object, a color of an object, a texture of an object, or a shape of an object. In some embodiments, the first metadata may include artist information (for example name of a celebrity or a person) in case the detected object type is human.

In accordance with an embodiment, the first metadata associated with the filmed shot or the image frame 702 may be stored in the memory 206. In accordance with an embodiment, the circuitry 202 may be configured to receive a third user input from the user 110, via the I/O device 210, during the editing phase of the first video content 112. The third user input may include a request to perform a duplicacy check on the first video content 112. The user 110 (for example the editor) may conduct the duplicacy check on the first video content 112 to confirm whether the captured filmed shots or the plurality of objects in the filmed shots of the first video content 112 are not included in any other video content (for example other movies) already released. Based on the duplicacy check, the video editing device 102 may ensure that the captured filmed shots and the included set of objects (or combination) are newly introduced in the first video content 112 which may further enhance the creditability and the popularity of the first video content 112.

In accordance with an embodiment, in response to the receipt of the third user input, the circuitry 202 may be configured to retrieve the stored first metadata associated with the image frame 702 (or the filmed scene which includes the image frame 702). In some embodiments, the circuitry 202 may be configured to determine the first metadata associated with the detected objects in the image frame 702. In accordance with an embodiment, the circuitry 202 may be further configured to retrieve a second metadata from the server 106. The second metadata may be associated with a plurality of filmed shots of second video content (i.e. different from the first video content 112). For example, the second video content may correspond to previous or older movies already been released to viewers. In some embodiments, the second video content may correspond a content or movie production organization (for example a movie banner) which may be responsible for capture of the first video content 112.

The second metadata may include information related to the plurality of filmed shots of the second video content. The information related to the second video content may include, but are not limited to, information about objects in the plurality of filmed shots, artist information of the plurality of filmed shots, or geo-location information at which the plurality of filmed shots are captured. In accordance with an embodiment, the circuitry 202 may be configured to retrieve the second metadata for each of the plurality of filmed shots of the second video content. The circuitry 202 may be further configured to compare the first metadata (i.e. associated with the filmed shot which includes the image frame 702) with the second metadata for each of the plurality of filmed shots of the second video content. In case, the first metadata matches with the second metadata for one of the plurality of filmed shots of the second video content, the circuitry 202 may determine that the captured filmed shot (or the first object 704, the second object 706, the third object 708, or the combination) in the first video content 112 may be present or already been captured/used in the second video content (for example older movies). This indicates the duplicacy of the filmed shot (or the first object 704, the second object 706, the third object 708, or the combination) between the first video content 112 and the second video content.

In accordance with an embodiment, the circuitry 202 may be further configured to generate the notification information for the user based on identification of the duplicacy. In some embodiments, the generated notification information may indicate the error message that may indicate a reproduction of a filmed scene or the filmed shot of the first video content 112 in the second video content. The circuitry 202 may be further configured to control the display screen 104 to display the notification information generated based on the duplicacy check. In accordance with an embodiment, the notification information may include the identifier of the filmed scene, the identification information of the filmed shot, and the details of the objects which were found duplicate in comparison with the second video content.

In accordance with an embodiment, the circuitry 202 may be configured to conduct the duplicacy check for each of the plurality of filmed shots of the first video content 112. In some embodiments, the circuitry 202 may be configured to retrieve the second metadata associated with a plurality of videos or movies stored in the server 106 to conduct the duplicacy check. Thus, with the duplicacy check capability, the video editing device 102 may provide automatic alerts to the user 110 about the duplicate shots (or combination of same objects in the shot). Based on the automatic alerts, the user 110 may further take appropriate actions (i.e. either to reshoot the shot or edit the duplicate objects) before finalization of the first video content 112. This further provides novelty to the first video content 112 and prevents incorporation of similar scene or shot from the previous video content. Thus, the popularity of the first video content 112 among the audiences may be enhanced.

Figure 8A:
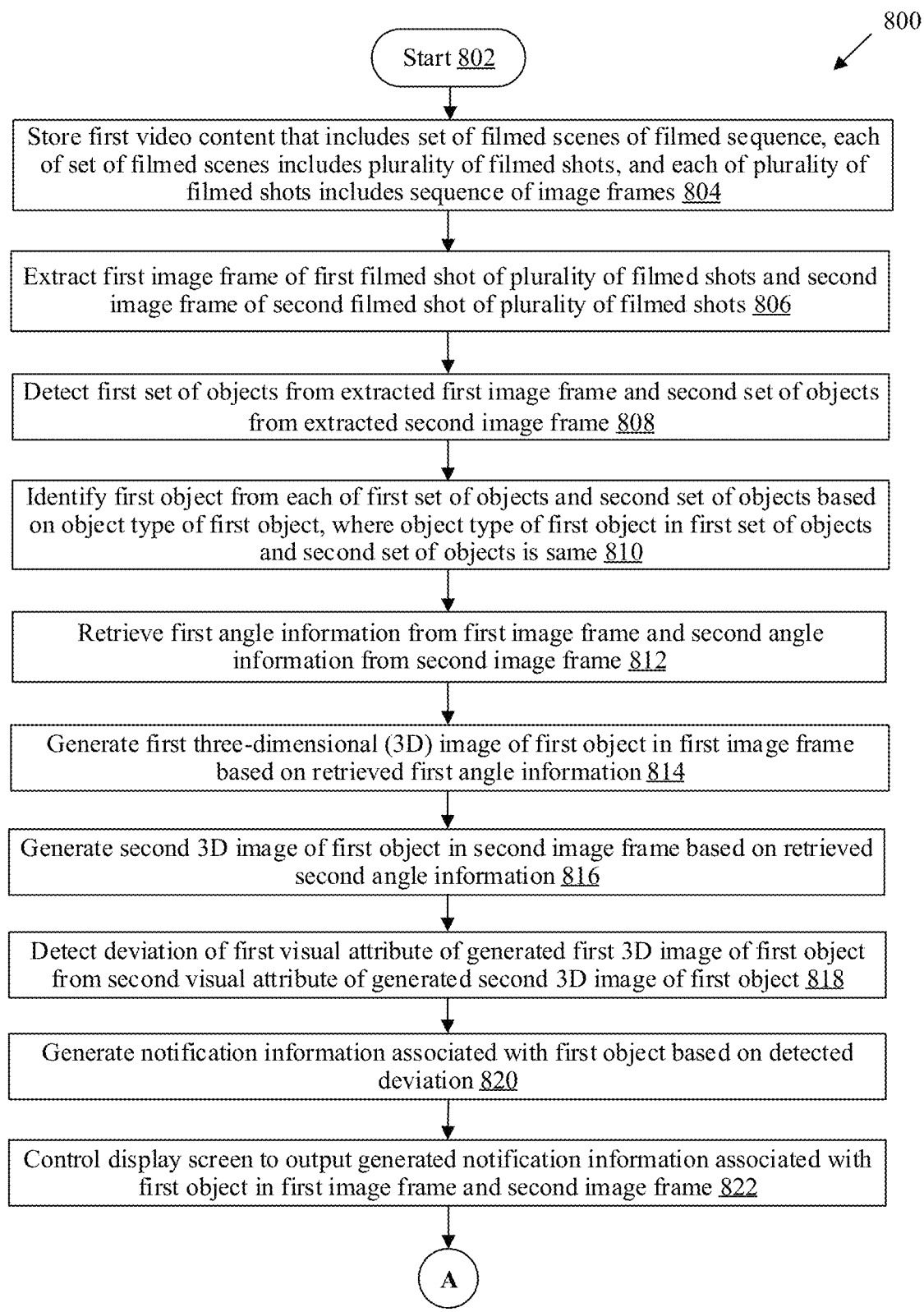
FIGS. 8A and 8B, collectively, depict a flowchart that illustrates exemplary operations for control of notifications for deviations in depiction of different objects in filmed shots of video content, in accordance with an embodiment of the disclosure.
Figure 8B:
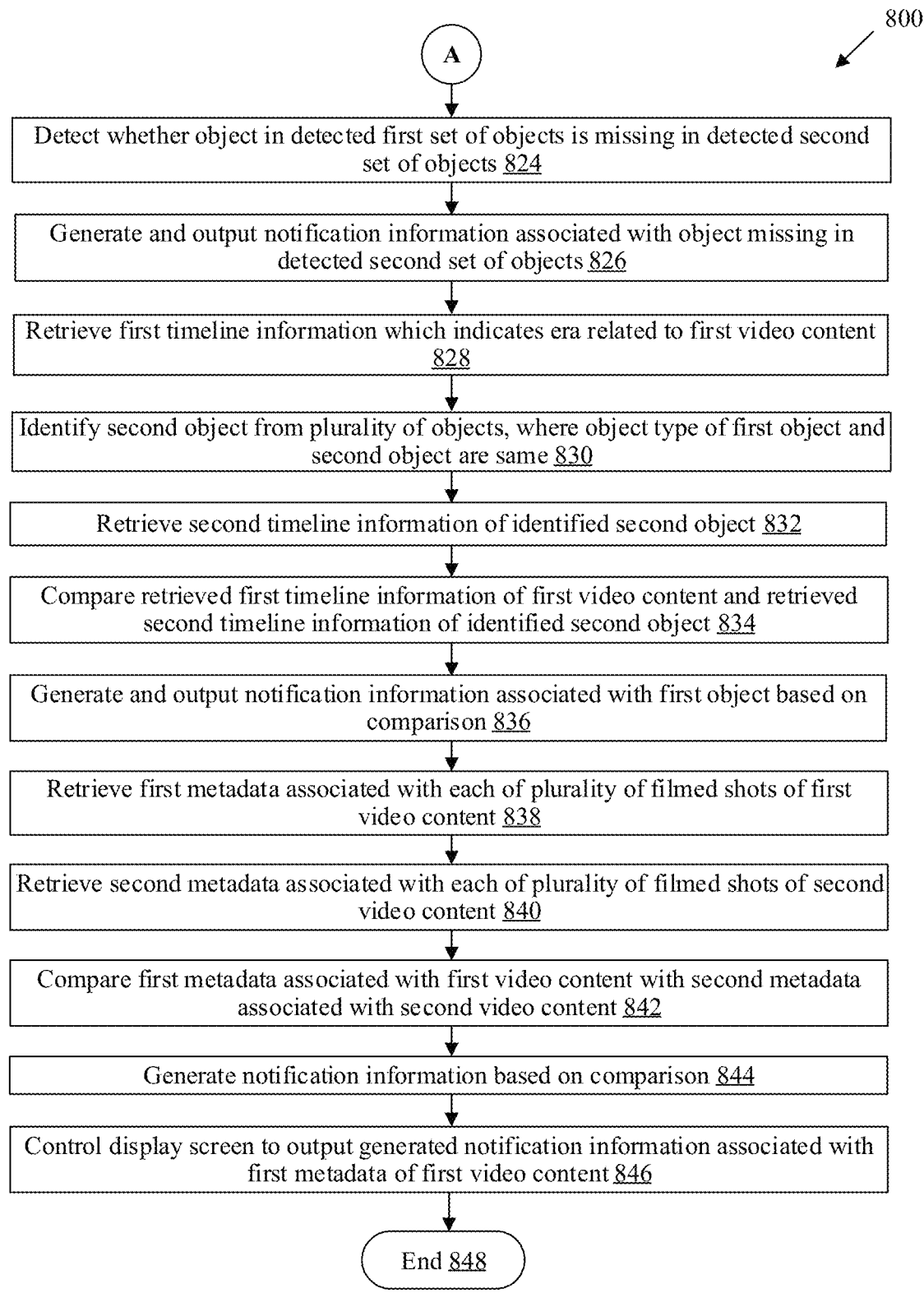

FIGS. 8A and 8B, collectively, depict a flowchart that illustrates exemplary operations for control of notifications for deviations in depiction of different objects in filmed shots of video content, in accordance with an embodiment of the disclosure. FIGS. 8A and 8B are explained in conjunction with elements from FIGS. 1, 2, 3, 4A, 4B, 5, 6, and 7. With reference to FIGS. 8A and 8B, there is shown a flowchart 800. The operations from 802 to 848 may be implemented on the video editing device 102. The operations starts at 802 and proceeds to 804.

At 804, first video content 112 that may include a set of filmed scenes 114A to 114B of a filmed sequence may be stored, each of the set of filmed scenes 114A to 114B may include a plurality of filmed shots and each of the plurality of filmed shots may include a sequence of image frames. In accordance with an embodiment, the memory 206 may be configured to store the first video content 112 that may include the set of filmed scenes 114A to 114B of the filmed sequence. In accordance with an embodiment, the video editing device 102 may be configured to retrieve the first video content 112 from the memory 206. In some embodiments, the video editing device 102 may be configured to retrieve the first video content 112 from the server 106.

At 806, a first image frame 122 of a first filmed shot 116A of the plurality of filmed shots and a second image frame 124 of a second filmed shot 116B of the plurality of filmed shots may be extracted. In accordance with an embodiment, the circuitry 202 may be configured to extract the first image frame 122 of the first filmed shot 116A of the plurality of filmed shots and the second image frame 124 of the second filmed shot 116B of the plurality of filmed shots. The first image frame 122 may be a last frame of the first filmed shot 116A and the second image frame may be a first frame of the second filmed shot 116B.

At 808, a first set of objects may be detected from the extracted first image frame 122 of the first filmed shot 116A and a second set of objects may be detected from the extracted second image frame 124 of the second filmed shot 116B. The object detector 204 may be configured to detect the first set of objects from the extracted first image frame 122 of the first filmed shot 116A and the second set of objects from the extracted second image frame 124 of the second filmed shot 116B.

At 810, a first object from each of the first set of objects and the second set of objects may be identified based on an object type of the first object, where the object type of the first object in the first set of objects and the second set of objects is same. In accordance with an embodiment, the object detector 204 may be configured to identify the first object from each of the first set of objects and the second set of objects based on the object type of the first object.

At 812, first angle information from the first image frame 122 and second angle information from the second image frame 124 may be retrieved. In accordance with an embodiment, the circuitry 202 may be configured to retrieve the first angle information from the first image frame 122 and the second angle information from the second image frame 124.

At 814, a first three-dimensional (3D) image of the first object in the first image frame 122 may be generated based on the retrieved first angle information. In accordance with an embodiment, the circuitry 202 may be configured to generate the first 3D image of the first object in the first image frame 122 based on the retrieved first angle information. The generation of the first 3D image of the first object in the first image frame 122 may be described in detail, for example, in FIG. 5.

At 816, a second 3D image of the first object in the second image frame 124 may be generated based on the retrieved second angle information. In accordance with an embodiment, the circuitry 202 may be configured to generate the second 3D image of the first object in the second image frame 124 based on the retrieved second angle information. The generation of the second 3D image of the first object in the second image frame 124 may be described in detail, for example, in FIG. 5.

At 818, a deviation of a first visual attribute of the generated first 3D image of the first object from a second visual attribute of the generated second 3D image of the first object may be detected. In accordance with an embodiment, the video editing device 102 may be configured to detect the deviation of the first visual attribute of the generated first 3D image of the first object from the second visual attribute of the generated second 3D image of the first object. The first visual attribute and the second visual attribute may be of same type. Examples of the first visual attribute and the second visual attribute may include, but are not limited to, a shape, a size, a dimension, a color, a brightness value, a contrast value, a texture, an orientation, an angle of tilt, a posture, or textual information.

At 820, the notification information associated with the first object may be generated based on the detected deviation. The circuitry 202 may be configured to generate the notification information associated with the first object based on the detected deviation.

At 822, the display screen 104 may be controlled to output the generated notification information associated with the first object in the first image frame 122 and the second image frame 124. The circuitry 202 may be configured to control the display screen 104 to output the generated notification information associated with the first object in the first image frame 122 and the second image frame 124.

At 824, it may be detected whether an object in the detected first set of objects is missing in the detected second set of objects. The circuitry 202 may be configured to detect whether the object in the detected first set of objects is missing in the detected second set of objects.

At 826, the notification information associated with the object missing in the detected second set of objects may be generated and output. The circuitry 202 may be configured to generate and output the notification information associated with the object missing in the detected second set of objects.

At 828, the first timeline information which indicates the era related to the first video content 112 may be retrieved. The circuitry 202 may be configured to retrieve the first timeline information which indicates the era related to the first video content 112. The first timeline information may be described in detail, for example, in FIG. 6. In some embodiments, the circuitry 202 may be configured to receive the first timeline information from the user 110, via the I/O device 210. The first timeline information may be included in the second user input received from the user 110.

At 830, a second object may be identified from a plurality of objects, where the object type of the first object and the second object are same. The circuitry 202 may be configured to identify the second object from the plurality of objects stored in the server 106. The identification of the second object from the plurality of objects stored in the server 106 may be described, in detail, for example, in FIG. 6.

At 832, the second timeline information of the identified second object may be retrieved. The circuitry 202 may be configured to retrieve the second timeline information of the identified second object from the server 106 as described in detail, for example, in FIG. 6.

At 834, the retrieved first timeline information of the first video content 112 and the retrieved second timeline information of the identified second object may be compared. The circuitry 202 may be configured to compare the retrieved first timeline information of the first video content 112 and the retrieved second timeline information of the identified second object as described in detail, for example, in FIG. 6.

At 836, the notification information associated with the first object may be generated and output based on the comparison. The circuitry 202 may be configured to generate and output the notification information associated with the first object based on the comparison as described in detail, for example, in FIG. 6.

At 838, the first metadata associated with each of the plurality of filmed shots of the first video content 112 may be retrieved. The circuitry 202 may be configured to retrieve the first metadata associated with each of the plurality of filmed shots of the first video content 112. In some embodiments, the circuitry 202 may be configured to determine details associated with the detected objects, as the first metadata, based on the analysis of the detected objects. Examples of the details, may include, but are not limited to, a size of an object, a dimension of an object, an object type of an object, a geo-location at which the image frame 702 was captured, a posture of an object, an orientation of an object, a color of an object, a texture of an object, or a shape of an object. In some embodiments, the first metadata may include artist information (for example name of a celebrity or a person) in case the detected object type is human. The first metadata associated with each of the plurality of filmed shots of the first video content 112 may be described in detail, for example, in FIG. 7.

At 840, the second metadata associated with each of plurality of filmed shots of second video content may be retrieved. The circuitry 202 may be configured to retrieve the second metadata associated with each of plurality of filmed shots of second video content as described in detail, for example, in FIG. 7. The second metadata may include information related to the plurality of filmed shots of the second video content. The information related to the second video content may include, but are not limited to, information about objects in the plurality of filmed shots, artist information of the plurality of filmed shots, or geo-location information at which the plurality of filmed shots are captured.

At 842, the first metadata associated with the first video content 112 may be compared with the second metadata associated with second video content. The circuitry 202 may be configured to compare the first metadata associated with the first video content 112 with the second metadata associated with the second video content.

At 844, the notification information may be generated based on the comparison. The circuitry 202 may be configured to generate the notification information based on the comparison between the first metadata associated with the first video content 112 and the second metadata associated with the second video content.

At 846, the display screen 104 may be controlled to output the generated notification information associated with the first metadata of the first video content 112. The circuitry 202 may be configured to control the display screen 104 o output the generated notification information associated with the first metadata of the first video content 112. Control passes to end 848.

Exemplary aspects of the disclosure may include a video editing device (such as the video editing device 102 of FIG. 1) that includes a memory (such as the memory 206 of FIG. 2) configured to store first video content (such as the first video content 112 of FIG. 1). The first video content 112 may include a set of filmed scenes (such as the set of filmed scenes 114A to 114B of FIG. 1) of a filmed sequence. Each of the set of filmed scenes 114A to 114B may include a plurality of filmed shots, and each of the plurality of filmed shots may include a sequence of image frames (such as the sequence of image frames 118 and the sequence of image frames 120 of FIG. 1). The video editing device 102 may further include circuitry (such as the circuitry 202 of FIG. 2) configured to extract a first image frame (such as the first image frame 122 of FIG. 1) of a first filmed shot (such as the first filmed shot 116A of FIG. 1) of the plurality of filmed shots. The circuitry 202 may be further configured to extract a second image frame (such as the second image frame 124 of FIG. 1) of a second filmed shot (such as the second filmed shot 116B of FIG. 1) of the plurality of shots.

In accordance with an embodiment, the circuitry 202 may be configured to detect a first set of objects from the extracted first image frame 122 of the first filmed shot 116A and a second set of objects from the extracted second image frame 124 of the second filmed shot 116B. The circuitry 202 may be further configured to identify a first object from each of the first set of objects and the second set of objects based on an object type of the first object. The object type of the first object in the first set of objects and the second set of objects is same. The circuitry 202 may be further configured to generate notification information associated with the first object based on a deviation of at least a first visual attribute of the first object in the first image frame 122 from at least a second visual attribute of the first object in the second image frame 124. The first visual attribute and the second visual attribute may be of same type The circuitry 202 may be further configured to control a display screen (such as the display screen 104 of FIG. 1) to output the generated notification information associated with the first object in the first image frame 122 and the second image frame 124.

In accordance with an embodiment, the first filmed shot 116A and the second filmed shot 116B may be consecutive shots of a first filmed scene (such as the first filmed scene 114A of FIG. 1) of the set of filmed scenes of the first video content 112. The first image frame 122 may be a last frame among the sequence of image frames of the first filmed shot 116A and the second image frame 124 may be a first frame among the sequence of image frames of the second filmed shot 116B. In accordance with an embodiment, the first filmed shot 116A and the second filmed shot 116B correspond to the first filmed scene 114A of the set of filmed scenes of the first video content 112.

In accordance with an embodiment, the first filmed shot 116A and the second filmed shot 116B may correspond to different filmed scenes of the set of filmed scenes of the first video content 112, where the different filmed scenes may correspond to same context.

In accordance with an embodiment, the at least first visual attribute and the at least second visual attribute may include at least one of a shape, a size, a dimension, a color, a brightness value, a contrast value, a texture, an orientation, an angle of tilt, a posture, or textual information of the first object.

In accordance with an embodiment, the first filmed shot 116A may include first angle information and the second filmed shot 116B may include second angle information. The circuitry 202 may be further configured to generate a first three-dimensional (3D) image of the first object in the extracted first image frame 122 of the first filmed shot 116A based on the first angle information. The circuitry 202 may be further configured to generate a second 3D image of the first object in the extracted second image frame 124 of the second filmed shot 116B based on the second angle information. The circuitry 202 may be further configured to generate the notification information based on a difference in the determined first 3D image and the determined second 3D image.

In accordance with an embodiment, the first video content 112 may include first timeline information which indicates an era related to the first video content 112. The circuitry 202 may be further configured to compare the first object in the extracted first image frame 122 with a plurality of objects in a master database on a server (such as the server 106) based on the object type of the first object and an object type of the plurality of objects in the master database. The circuitry 202 may be further configured to retrieve second timeline information associated with an object of the plurality of objects in the master database based on the comparison. The second timeline information may indicate timing information of invention, discovery, use, market release, or evolution of the object. The circuitry 202 may be further configured to compare the first timeline information with the retrieved second timeline information and generate the notification information associated with the first object based on the comparison of the first timeline information with the retrieved second timeline information.

In accordance with an embodiment, the notification information may include a first error message that may indicate a production error in depiction of the first object in the extracted second image frame 124.

In accordance with an embodiment, the circuitry 202 may be further configured to determine a first position of the first object in the first image frame 122 and a second position of the first object in the second image frame 124. The circuitry 202 may be further configured to generate the notification information based on a position deviation of the first position from the second position, where the position deviation is based on context of the first filmed scene 114A that may include the first object.

In accordance with an embodiment, the circuitry 202 may be further configured to determine whether the first object in the detected first set of objects is absent in the detected second set of objects of the extracted second image frame 124. The circuitry 202 may be further configured to generate the notification information, as a second error message, based on the determination that the first object is absent in the detected second set of objects of the extracted second image frame 124.

In accordance with an embodiment, the notification information may include at least one of the object type related to the first object, identification information the first filmed shot, or an identifier of the first filmed scene 114A that may include the first object. In accordance with an embodiment, the circuitry 202 may be further configured to add the notification information as metadata in the first video content 112.

In accordance with an embodiment, the circuitry 202 may be further configured to determine a first metadata associated with the detected first set of objects and the second set of objects. The first metadata may include information that may indicate a geo-location at which each of the plurality of filmed shots is captured, artist information, or information about the detected first set of objects, and the detected second set of objects. In accordance with an embodiment, the circuitry 202 may be further configured to retrieve a second metadata associated with a plurality of filmed shots related to second video content from the server 106. The circuitry 202 may be further configured to compare the first metadata of the first video content 112 with the second metadata of the second video content. The circuitry 202 may be further configured to generate the notification information based on the comparison. The notification information may include a third error message that may indicate a reproduction of a filmed scene or a filmed shot of the first video content 112 in the second video content.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for continuity check in video content. The at least one code section may cause the machine and/or computer to perform the steps that comprise storage of first video content that comprises a set of filmed scenes of a filmed sequence; where each of the set of filmed scenes comprises a plurality of filmed shots, and wherein each of the plurality of filmed shots comprises a sequence of image frames. Further, a first image frame of a first filmed shot of the plurality of filmed shots and a second image frame of a second filmed shot of the plurality of filmed shots may be extracted. A first set of objects from the extracted first image frame and a second set of objects from the extracted second image frame may be detected. A first object from each of the first set of objects and the second set of objects based on an object type of the first object may be identified. The object type of the first object in the first set of objects and the second set of objects may be same. Notification information associated with the first object may be further generated based on a deviation of at least a first visual attribute of the first object in the first image frame from at least a second visual attribute of the first object in the second image frame, wherein the first visual attribute and the second visual attribute are of same type. A display screen may be further controlled to output the generated notification information associated with the first object in the first image frame and the second image frame.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:
1. A video editing device, comprising:
 a memory configured to store first video content that comprises a set of filmed scenes of a filmed sequence, wherein
  each of the set of filmed scenes comprises a plurality of filmed shots, and
  each of the plurality of filmed shots comprises a sequence of image frames; and
 circuitry configured to:
  extract a first image frame of a first filmed shot of the plurality of filmed shots and a second image frame of a second filmed shot of the plurality of filmed shots;
  detect a first set of objects from the extracted first image frame and a second set of objects from the extracted second image frame;
  identify a first object from each of the detected first set of objects and the detected second set of objects based on an object type of the first object, wherein the object type of the first object in the detected first set of objects and the detected second set of objects is same;
  determine whether the first object in the detected first set of objects is absent in the detected second set of objects of the extracted second image frame;
  generate, as a first error message, notification information associated with the first object based on a deviation of at least a first visual attribute of the first object in the extracted first image frame from at least a second visual attribute of the first object in the extracted second image frame and based on the determination that the first object is absent in the detected second set of objects, wherein the first visual attribute and the second visual attribute are of same type; and
  control a display screen to output the generated notification information associated with the first object in the extracted first image frame and the extracted second image frame, wherein
   the generated notification information comprises a second error message that indicates a continuity error in depiction of the first object in the extracted second image frame, and the continuity error corresponds to a discontinuity in at least one of a shape, a size, textual information, a texture, or a color of the first object between the extracted first image frame and the extracted second image frame.

2. The video editing device according to claim 1, wherein the first filmed shot and the second filmed shot are consecutive shots of a first filmed scene of the set of filmed scenes of the first video content, and the first image frame is a last frame among the sequence of image frames of the first filmed shot and the second image frame is a first frame among the sequence of image frames of the second filmed shot.

3. The video editing device according to claim 1, wherein the first filmed shot and the second filmed shot correspond to a first filmed scene of the set of filmed scenes of the first video content.

4. The video editing device according to claim 1, wherein the first filmed shot and the second filmed shot correspond to different filmed scenes of the set of filmed scenes of the first video content, and the different filmed scenes correspond to same context.

5. The video editing device according to claim 1, wherein the at least first visual attribute and the at least second visual attribute comprise at least one of the shape, the size, a dimension, the color, a brightness value, a contrast value, the texture, an orientation, an angle of tilt, a posture, or the textual information of the first object.

6. The video editing device according to claim 1, wherein the first filmed shot includes first angle information and the second filmed shot includes second angle information, the first angle information indicates a first angle at which the first filmed shot is captured, and the second angle information indicates a second angle at which the second filmed shot is captured.

7. The video editing device according to claim 6, wherein the circuitry is further configured to:

generate a first three-dimensional (3D) image of the first object in the extracted first image frame based on the first angle information;

generate a second 3D image of the first object in the extracted second image frame based on the second angle information; and generate the notification information based on a difference between the first 3D image and the second 3D image.

8. The video editing device according to claim 1, wherein the first video content includes first timeline information which indicates an era associated with the first video content.

9. The video editing device according to claim 8, wherein the circuitry is further configured to:

compare the first object in the extracted first image frame with a plurality of objects in a master database on a server based on the object type of the first object and an object type of the plurality of objects in the master database;

retrieve second timeline information associated with an object of the plurality of objects in the master database based on the comparison between the first object and the plurality of objects, wherein the second timeline information indicates timing information of at least one of invention, discovery, use, market release, or evolution of the object;

compare the first timeline information with the retrieved second timeline information; and generate the notification information associated with the first object based on the comparison of the first timeline information with the retrieved second timeline information.

10. The video editing device according to claim 1, wherein the circuitry is further configured to:

determine a first position of the first object in the first image frame and a second position of the first object in the second image frame; and generate the notification information based on a position deviation of the first position from the second position, wherein the position deviation is based on context of a first filmed scene that comprises the first object.

11. The video editing device according to claim 1, wherein the notification information further comprises at least one of the object type related to the first object, identification information of the first filmed shot, or an identifier of a first filmed scene that comprises the first object, and the circuitry is further configured to add the notification information as metadata in the first video content.

12. The video editing device according to claim 1, wherein the circuitry is further configured to determine a first metadata associated with the detected first set of objects and the detected second set of objects, and the first metadata comprises information that indicates at least one of a geo-location at which each of the plurality of filmed shots is captured, artist information, or information about the detected first set of objects and the detected second set of objects.

13. The video editing device according to claim 12, wherein the circuitry is further configured to:

retrieve a second metadata associated with the plurality of filmed shots associated with second video content from a server;

compare the first metadata of the first video content with the second metadata of the second video content; and generate the notification information based on the comparison between the first metadata and the second metadata, wherein the notification information further comprises a third error message that indicates a reproduction of a filmed scene or a filmed shot of the first video content in the second video content.

14. A method, comprising:

in a video editing device:

storing first video content that comprises a set of filmed scenes of a filmed sequence, wherein each of the set of filmed scenes comprises a plurality of filmed shots, and each of the plurality of filmed shots comprises a sequence of image frames;

extracting a first image frame of a first filmed shot of the plurality of filmed shots and a second image frame of a second filmed shot of the plurality of filmed shots;

detecting a first set of objects from the extracted first image frame and a second set of objects from the extracted second image frame;

identifying a first object from each of the detected first set of objects and the detected second set of objects based on an object type of the first object, wherein the object type of the first object in the detected first set of objects and the detected second set of objects is same;

determining whether the first object in the detected first set of objects is absent in the detected second set of objects of the extracted second image frame;

generating, as a first error message, notification information associated with the first object based on a deviation of at least a first visual attribute of the first object in the extracted first image frame from at least a second visual attribute of the first object in the extracted second image frame and based on the determination that the first object is absent in the detected second set of objects, wherein the first visual attribute and the second visual attribute are of same type; and controlling a display screen to output the generated notification information associated with the first object in the extracted first image frame and the extracted second image frame, wherein the generated notification information comprises a first second error message that indicates a continuity error in depiction of the first object in the extracted second image frame, and the continuity error corresponds to a discontinuity in at least one of a shape, a size, textual information, a texture, or a color of the first object between the extracted first image frame and the extracted second image frame.

15. The method according to claim 14, wherein the first filmed shot and the second filmed shot are consecutive shots of a first filmed scene of the set of filmed scenes of the first video content, and the first image frame is a last frame among the sequence of image frames of the first filmed shot and the second image frame is a first frame among the sequence of image frames of the second filmed shot.

16. The method according to claim 14, wherein the first filmed shot and the second filmed shot correspond to a first filmed scene of the set of filmed scenes of the first video content.

17. The method according to claim 14, wherein the first filmed shot and the second filmed shot correspond to different filmed scenes of the set of filmed scenes of the first video content, and the different filmed scenes correspond to same context.

18. The method according to claim 14, wherein the at least first visual attribute and the at least second visual attribute comprise at least one of the shape, the size, a dimension, the color, a brightness value, a contrast value, the texture, an orientation, an angle of tilt, a posture, or the textual information of the first object.

19. A video editing device, comprising:

a memory configured to store first video content that comprises a set of filmed scenes of a filmed sequence, wherein each of the set of filmed scenes comprises a plurality of filmed shots, and each of the plurality of filmed shots comprises a sequence of image frames; and circuitry configured to:

extract a first image frame of a first filmed shot of the plurality of filmed shots and a second image frame of a second filmed shot of the plurality of filmed shots;

detect a first set of objects from the extracted first image frame and a second set of objects from the extracted second image frame;

identify a first object from each of the first set of objects and the second set of objects based on an object type of the first object, wherein the object type of the first object in the first set of objects and the second set of objects is same;

determine whether the first object in the detected first set of objects is absent in the detected second set of objects of the extracted second image frame;

generate notification information, as an error message, associated with the first object based on a deviation of at least a first visual attribute of the first object in the first image frame from at least a second visual attribute of the first object in the second image frame and based on the determination that the first object is absent in the detected second set of objects, wherein the first visual attribute and the second visual attribute are of same type; and control a display screen to output the generated notification information associated with the first object in the first image frame and the second image frame.

20. A video editing device, comprising:

a memory configured to store first video content that comprises a set of filmed scenes of a filmed sequence and first timeline information which indicates an era associated with the first video content, wherein each of the set of filmed scenes comprises a plurality of filmed shots, and each of the plurality of filmed shots comprises a sequence of image frames; and circuitry configured to:

extract a first image frame of a first filmed shot of the plurality of filmed shots and a second image frame of a second filmed shot of the plurality of filmed shots;

detect a first set of objects from the extracted first image frame and a second set of objects from the extracted second image frame;

identify a first object from each of the first set of objects and the second set of objects based on an object type of the first object, wherein the object type of the first object in the first set of objects and the second set of objects is same;

compare the first object in the extracted first image frame with a plurality of objects in a master database on a server based on the object type of the first object and an object type of the plurality of objects in the master database;

retrieve second timeline information associated with an object of the plurality of objects in the master database based on the comparison between the first object and the plurality of objects, wherein the second timeline information indicates timing information of at least one of invention, discovery, use, market release, or evolution of the object;

compare the first timeline information with the retrieved second timeline information;

generate notification information associated with the first object based on a deviation of at least a first visual attribute of the first object in the extracted first image frame from at least a second visual attribute of the first object in the extracted second image frame and based on the comparison of the first timeline information with the retrieved second timeline information, wherein the first visual attribute and the second visual attribute are of same type; and control a display screen to output the generated notification information associated with the first object in the extracted first image frame and the extracted second image frame, wherein the generated notification information comprises an error message that indicates a continuity error in depiction of the first object in the extracted second image frame, and the continuity error corresponds to a discontinuity in at least one of a shape, a size, textual information, a texture, or a color of the first object between the extracted first image frame and the extracted second image frame.

* * * * *